(12) United States Patent
Goodwin

(10) Patent No.: US 10,302,419 B2
(45) Date of Patent: May 28, 2019

(54) SYSTEM AND METHOD FOR A DISPLACEMENT MEASUREMENT

(71) Applicant: Nikon Corporation, Tokyo (JP)

(72) Inventor: Eric Peter Goodwin, Oro Valley, AZ (US)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/632,849

(22) Filed: Jun. 26, 2017

(65) Prior Publication Data

US 2018/0003484 A1 Jan. 4, 2018

Related U.S. Application Data

(60) Provisional application No. 62/356,069, filed on Jun. 29, 2016.

(51) Int. Cl.
*G01B 11/24* (2006.01)
*G01B 9/02* (2006.01)

(52) U.S. Cl.
CPC ........ *G01B 11/2441* (2013.01); *G01B 9/0209* (2013.01); *G01B 9/02032* (2013.01); *G01B 9/02049* (2013.01); *G01B 9/02085* (2013.01); *G01B 2290/50* (2013.01)

(58) Field of Classification Search
CPC .................. G01B 11/2441; G01B 9/02015
See application file for complete search history.

(56) References Cited

U.S. PATENT DOCUMENTS

| | | | |
|---|---|---|---|
| 6,449,048 B1 * | 9/2002 | Olszak ............. | G01B 11/2441 356/497 |
| 7,061,625 B1 | 6/2006 | Hwang et al. | |
| 2010/0277746 A1 * | 11/2010 | Chen ................ | G01B 11/2441 356/519 |
| 2012/0120485 A1 * | 5/2012 | Ootomo ............ | G01B 9/04 359/370 |
| 2015/0077760 A1 * | 3/2015 | Koerner ........... | G01B 9/02008 356/496 |

OTHER PUBLICATIONS

A. Dubois, et al., "Phase Measurements with Wide-Aperture Interferometers," Applied Optics, vol. 39, No. 14 (May 2000) pp. 2326-2331.
P. Lambelet, et al., "Fast and Accurate Line Scanner Based on White Light Interferometry," Proc. of SPIE, vol. 8788 (2013), downloaded from http://reviews.spiedigitallibrary.org, on Sep. 27, 2016.
J. Niehues, et al., "Low Coherent Linnik Interferometer Optimized for Use in Nano Measuring Machines," 56th International Scientific Colloquium, Ilmenau University of Technology, Sep. 12-16, 2011.

* cited by examiner

*Primary Examiner* — Jonathan M Hansen
(74) *Attorney, Agent, or Firm* — Yakov S. Sidorin; Quarles & Brady LLP

(57) ABSTRACT

System and method for profiling of a surface with lateral scanning interferometer the optical axis of which is perpendicular to the surface. In-plane scanning of the surface is carried out with increments that correspond to integer number of pixels of an employed optical detector. Determination of height profile of a region-of-interest that is incomparably larger than a FOV of the interferometer objective is performed in time reduced by at least an order of magnitude as compared to time required for the same determination by a vertical scanning interferometer.

10 Claims, 13 Drawing Sheets

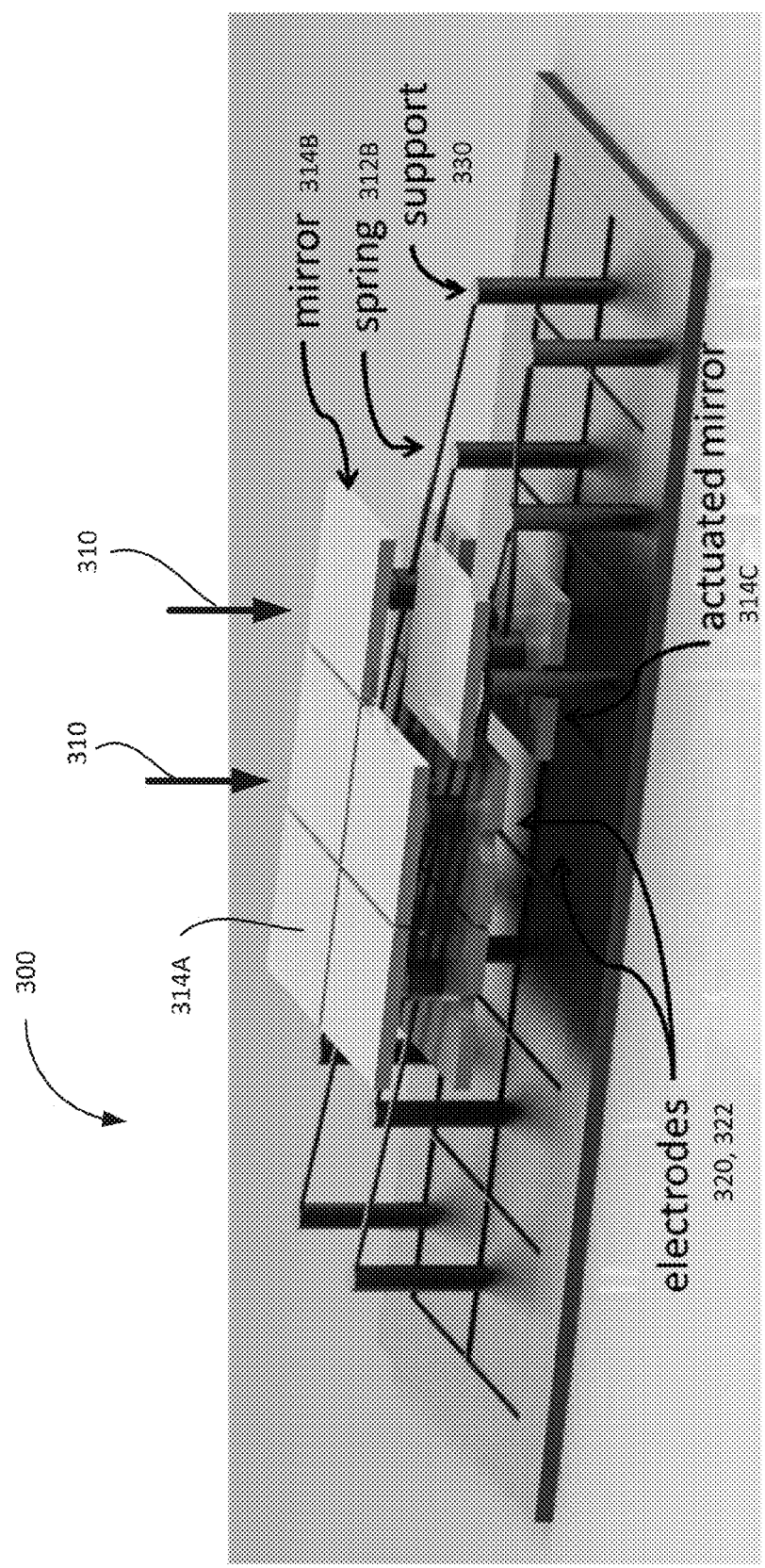

SYSTEM AND METHOD FOR A DISPLACEMENT MEASUREMENT

CROSS-REFERENCE TO RELATED APPLICATIONS

The present application claims priority from and benefit of U.S. Provisional Patent Application No. 62/356,069 filed on Jun. 29, 2016. The disclosure of the above-identified patent application is incorporated by reference herein.

TECHNICAL FIELD

The present invention relates to systems and methods for non-contact profilometry of surfaces and, more particularly, to lateral scanning interferometric systems devoid of angular tilt intentionally introduced between the interferometric objective and the sample stage.

BACKGROUND

Production processes in micro- and nano-technology requires adequate measuring instruments to obtain three-dimensional (3D) geometries. Vertical scanning interferometry (such as scanning white-light interferometry, in one example) achieves a nanometer resolution/accuracy in the axial direction, and is particularly suited for the measurement of step height structures (for example, in micro-electro-mechanical, MEMS, structures). The measurement principle is based on a so-called phase-shifting, or depth scan, or z-scan, during which the optical path difference between the measuring and reference arms of the interferometer is varied in small steps. In the situations where the field-of-view (FOV) subtended by the object/sample is substantially higher than the FOV of the optical objective used with the interferometer, or in situations where the dimensions of the sample are incomparably larger than the FOV of the optical objective, the usefulness of this approach is severely diminished, both due to impractically-long times required for profiling of the whole sample, the errors introduced at high numerical apertures, and the continuous need for cumbersome stitching of images.

The methodology of lateral scanning white-light interferometry, while allowing for a continuous data acquisition and substantially eliminating the need for image stitching, requires an angular tilt between the optical axis of the objective and the normal to the sample surface, leading to a critical need in a regular stage tilt calibration.

SUMMARY

An embodiment of the present invention provides a method for profiling a surface with an in-plane scanning interferometer. The method includes positioning the surface perpendicularly to an optical axis of an objective in a sample arm of the interferometer; and configuring a reference arm of the interferometer to form interferometric fringes, at an optical detector of an optical system containing such interferometer. The fringes are tilted with respect to a chosen axis when the surface is illuminated through the sample arm. The method additionally includes acquiring optical data from a distribution of light formed at the optical detector and containing the interferometric fringes while the surface is being scanned along the chosen axis in a plane of the surface.

Embodiments additionally provide a method for profiling a surface. The method includes determining a height profile of the surface from phases of light distribution (formed in reflection of light by the surface with the use of an in-plane scanning interferometer and containing interferometric fringes that are angularly tilted with respect to a direction of an in-plane scanning of the surface), while the surface is being scanned in the direction perpendicular to an optical axis of a sample arm of the interferometer. In each of the embodiments, a width of an apodization curve, that limits the distribution of intensity of said interferometric fringes and represents a change in contrast of such interferometric fringes, can be optionally varied by modifying a cross-sectional profile of light delivered to the interferometer and used for measurements.

Embodiments further provide an apparatus for profiling a surface under test, which apparatus includes (i) a beam splitter positioned to divide a light beam from a light source into a measurement light beam and a reference light beam directed along a reference axis; and (ii) a reference reflector positioned in an optical path of the reference light beam, the reference reflector being inclined with respect to the reference axis. Here, the beam splitter is configured to direct the measurement light beam towards the surface to irradiate the surface and form a reflected measurement light beam, said reflected measurement light beam passing through the beam splitter to interfere with the reference light beam upon reflection thereof from the reference reflector.

BRIEF DESCRIPTION OF THE DRAWINGS

The invention will be more fully understood by referring to the following Detailed Description of Specific Embodiments in conjunction with the not-to scale Drawings, of which:

FIGS. 3A, 3B illustrate an embodiment of a scanning-light modulator (SLM) MEMS-based device;

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

Examples of embodiments of the present invention, discussed below, disclose methods and apparatus for a novel in-plane scanning interferometric technique the use of which facilitates surface profilometry and, in particular, a displacement of repositionable elements of the surface thereby enabling a verification of operability of a MEMS-based device without a need in measurement-related calibration of the measurement apparatus itself.

(1) Operational Considerations Arising with the Use of Related Phase-Shifting Interferometric Measurement Systems and Addressed by the Implementations of the Present Invention.

Figure 1:
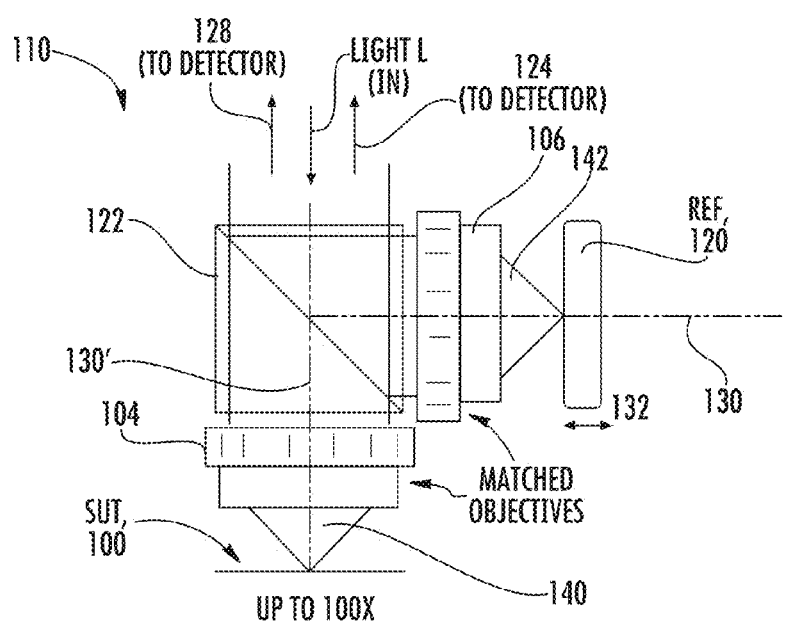
FIG. 1 is a schematic diagram illustrating a vertical scanning interferometer device.

A tool employing a vertically-scanning interferometer 110 (shown configured as a Linnik interferometer) with well-aligned optics (shown schematically as 100 in FIG. 1) is often used for phase-shifting-based profiling of a reflective surface 100 (referred to as surface under test, or SUT). Such a measurement tool, however, is subject to a rather substantial practical limitation. It requires optically-well-matched microscope objectives 104, 106 in reference and test arms of the interferometer (the latter containing the SUT 100), that is objectives the optical aberration characteristics of which are similar or substantially equal. Moreover, such measurement tool requires the presence of a reference reflector (REF, 120) in the reference arm; the REF has to be optically (meaning, after accounting for the possible spatial fold at the beamsplitter 122) parallel to the SUT 100. At the same time, many objectives in practice—and especially those used for qualitative and not quantitative measurements—are known to have substantially high aberration content and, therefore, are unlikely to be optically matched to a degree required for use in a well-balanced vertical scanning interferometer.

Figure 2A:
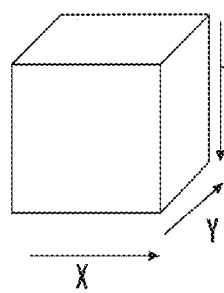
FIG. 2A is a schematic diagram of a data cube containing 3D data representing an optical signal that describes the profile of the sample under test (SUT) obtained with a conventional vertical scanning interferometer. Here, all individual image frames are aligned in x- and y-directions and each level of the data cube in the z direction represents a new, individual image frame.

In a z-axis phase-shifting operation of a vertical scanning interferometric setup, a beam L from the light source is collimated and divided into a measurement (sample, test) beam 140 and a reference beam 142 by a beam splitter. The light reflected from the reference and sample surfaces is then combined, and the image is projected onto a 2D imaging detector (such as a CCD, for example; not shown) for registration and further processing with a data-processing electronic circuitry (not shown) to form a 3D signal of FIG. 2A, representing a profile of the SUT. The detector registers multiple images of distributions of irradiance of light formed at the surface of the detector in time while the phase between the reference beam of light 124 (returned by the reference reflector 120, often a flat mirror) and the measurement beam 128 propagating through the interferometer 110 is being measured.

The conventionally-configured surface profile measurements possess several substantial shortcomings:

On the one hand, in order to reach high spatial resolution along the z-axis, some sort of phase scanning or phase shifting is required. As a result, the phase-shifting must be complemented with very small periodic reversible motions or displacements introduced between the reference reflector 120 and the SUT 100 along a direction of incidence of the measurement beam of light (optical axis or z-axis). Such motions or displacements are often introduced by making the reference mirror 120 shift (or "step") in step-increments on the order of 75-100 nm per increment or so over a distance of hundreds of microns in a direction defined to be transverse to the surface of the reference mirror (for example, along an optical axis 130 as shown with an arrow 132). Alternatively, the stepping or scanning of the SUT 100 along the optical axis 130' is used to achieve the same result. The optical aberrations of the objective(s) 104, 106 cause the retracing of errors of the measurement as well, which in the simplest case implies that the results of the phase-shifting-based measurement performed with the tool 110 contains a spatially-varying error of the SUT 100 topography, which spatially-varying error may depend on the shape of the measured part 100. While calibration of the conventionally-structured phase-shift measurement with the tool 110 can be performed, it is known in the art to be quite involved and difficult and desired to be avoided if possible.—Another operational shortcoming of using the conventional vertical-scanning-interferometer-based phase-shifting profiling tool stems from the fact that it is almost a given that the transverse dimensions of the SUT 100 are substantially larger than the field-of-view (FOV) of the objective (104, 106) used in the interferometer. For a numerical aperture, NA, of about 0.7 the resulting FOV of the objective might be only about or on the order of 300 microns by 300 microns, for example. When a larger sample needs to be measured (with a surface the dimensions of which are at least twice or more as large as the FOV of the objective in one example; or at least one order of magnitude larger than the FOV of the objective in another example, or at least two orders of magnitude larger in yet another example), its total area is typically operationally "split" or "subdivided" into a number of overlapping regions that are measured independently, and then stitching techniques are implemented to reconstruct the entire surface. For example, when the SUT 100 is tens or hundreds of millimeters across, in order to profile the SUT it must be scanned in the xy-plane (in a plane of the reflective surface being measured), which is perpendicular to the optical axis 130, 130' along which the relative shift between the reference reflector and SUT is introduced to collect phase-shifting optical data conventionally. As a result, the SUT-profiling procedure includes in-plane scanning of the SUT 100 in spatial increments on the order of several hundreds of microns over a distance exceeding tens of millimeters while, at the same time, performing multiple "stepping" in a z-direction at each of the incremental position of the scan. At a minimum, this causes the overall time, required to complete the acquisition of the phase-shifting optical data, to be impractically long. For example, in a case of a reasonably limited (in terms of z-profile) SUT, it may be assumed that a typical vertical-scanning commercial system can probably perform a vertical scan in under 10 seconds (for example, in 7 seconds). Stepping in x-and-y takes another few seconds (for example, 3 seconds). Based on these practically-justified assumptions, to complete a process of scanning of a 10×10 mm region of an SUT with a 0.3 mm×0.3 mm of the actual objective FOV (which, in practice is reduced to about 0.25 mm×0.25 mm of the effective FOV because of the practically-unavoidable spatial stitching overlaps) about 4.50 hours or more are required.

Yet another important aspect of the measurement optical signal acquired with the use of a conventional phase-shifting interferometric setup is that intensity of the interference fringes (formed as a result of optical interference between the test and reference beams returned through the objectives 104, 106 to the optical detector) are multiplied or apodized by a curve representing a degree of coherence of light L used for the measurements. (Such an apodization curve may be referred to as a "coherence envelope"). Indeed, contrast of the registered by the detector signal, which results from the interference between the sample and reference beams of light, is proportional to the modulus of the complex degree of the mutual coherence of the corresponding optical wavefronts. Because of the limited spectral bandwidth of light L, the interference can occur only in a limited space about a coherence plane defined by the zero optical path differences. This property usually is used for retrieval of the sample's height or topography.

Figure 2B:
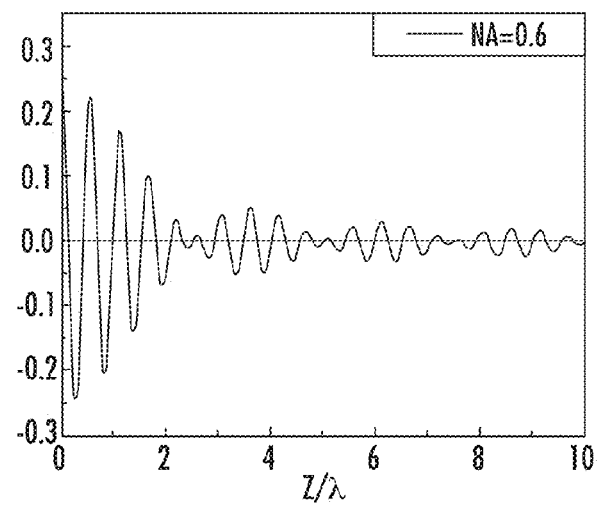
FIG. 2B presents a plot schematically illustrating loss of contrast of a signal, acquired with the conventional vertical scanning interferometer, and caused by behavior of a cross-term of interference between the monochromatic optical waves propagating through the reference and sample (test) arms of the vertical scanning interferometer (This effect generally depends on the spatial extent of the illumination source in the pupil of the microscope objective)

The apodization with the "coherence envelope" changes the fringe contrast as a function of a relative z-displacement between the reflectors 110, 120 because the various sections of the high-NA sample beam 140 are incident onto the SUT at angles varying from, for example, 0 degrees to 37 degrees (for NA=0.6 of the objective 104) or even up to 45 degrees (for NA=0.7). As a result, a z-displacement increment of $\Delta z=100$ nm on optical axis 130 causes a displacement of about $\Delta z/\cos(a\sin(NA))$, or about 141 nm along a direction corresponding to an angle of NA of 0.7. The integration of optical data acquired by the detector within the angular range from 0 degrees to 45 degrees inevitably causes loss in contrast that limits the coherence envelope for a monochromatic source of light L. A schematic example of this loss in contrast is shown in FIG. 2B, showing a behavior of a cross-term of interference between the monochromatic optical waves propagating through the reference and sample (test) arms of the vertical scanning interferometer of a phase-shifting measurement tool, for a NA=0.6 objectives 104, 106. Some SUT samples may include such surface height discontinuities that one part of the SUT surface relative to another part of the SUT surface simply cannot be determined, because the number of fringe cycles cannot be determined from a fringe image. This practical situation is often referred to as a 2pi phase ambiguity. The coherence envelope (an example of which is shown in FIG. 2B) has different contrast for each fringe in depth, and this information can be used to determine how many integer fringes there are between the two sides of a step. However, in many practical situations, such as the measurements of MEMS-devices discussed below, the user knows a priori that the total change-in-height of the surface discontinuities is limited to less than one-quarter of a wavelength of used light. A person of skill in the art, therefore, would appreciate that (considering the sampling theorem factor of 2 and the additional factor of 2 coming from the measurements carried out in reflection), no 2pi phase ambiguities is encountered during the measurements of such MEMS-based SUT. Put differently, the "coherence envelope" is much shorter for a high-NA beam than it is for a low-NA beam. In addition, the distance the substrate 100 must be moved to introduce a desired phase shift is different for light coming in at different angles, which is the cause of the coherence envelope narrowing that can be observed with a higher NA beam.

While these effects of loss in contrast and inconsistency (or difference) among the z-motion increments required for light coming at different angles as related to the measured interferometric signal may be viewed as acceptable for low-NA situations, under particular circumstances these deficiencies become operationally inadmissible. In particular, for applications where the SUT possesses surface features the imaging/profiling of which requires the use of objectives with NA high enough to bring to life the deficiencies of the conventionally-configured vertical scanning interferometer (such as, for example, NA of 0.6 or higher), these effects become serious practical impediments, especially when and if such SUT has a continuous (uninterrupted) or quasi-continuous surface or a surface that is "discretized" in a certain fashion. Embodiments of the present invention provide a solution that avoids and/or addresses these problems.

Accordingly:

One operational limitation of related art, solved by the present invention, stems from the fact that a conventionally-used vertical scanning phase-shifting interferometric modality employs a principle of periodic stepping or repositioning between the measured and reference surfaces in a direction perpendicular to the measured surface (referred to herein as z-stepping or z-scanning, for short) at each and every chosen location at the measured surface that is placed without transverse displacement within the FOV of the used objective during the whole duration of z-stepping procedure. Such z-stepping, repeated multiple times across numerous locations at the measured surface, requires an impermissibly-long time to spatially profile a reflective surface. Such typically-required impermissibly-long profiling time is reduced at least by an order of magnitude or more with the use of a presently-discussed metrology system of configured (i) to effectuate a phase-shifting measurement as a result of an "in-plane" repositioning or scanning of the measured surface (i.e., repositioning in the plane of the measured reflective surface) along a chosen scanning axis lying in such plane and (ii) to register interferometric fringes that are formed at a surface of an optical detector (at least in part due to optical interference of measurement light reflected from the reflective surface with reference light) and that are tilted or inclined, in such plane, with respect to the chosen scanning axis.

Another operation problem manifests in a specific case, when the reflective surface that is being measured with a conventional phase-shifting modality represents a surface of a spatial light modulator (such as that based on a MEMS device, for example) and is formed by an array of mirror elements (each with side dimensions on the order of a couple of microns by a couple of microns) that are configured to move in a direction transverse to the surface of the array (and referred to as a displacement direction). This operational problem is caused by lack of knowledge of whether displacements of such mirror elements are changing over time in a pre-determined (according to a design) fashion or, to the contrary, in an unpredictable fashion. This problem is solved with the use of a presently-discussed metrology instrument that employs an optical interferometer configured to effectuate a measurement based on a phase-shifting technique that is carried out in absence of any relative movement between the array of the mirror elements and the interferometer along the displacement direction and, instead, is carried out only due to the relative in-plane movement (that is, a movement along a plane of the array).

Examples of a continuous surface with a complex profile subtending large FOVs—(such as surfaces of, for example, CCD or CMOS sensors with micron-sized pixels over an area that is many millimeters on a side, or surfaces of DLP chips for use in projectors, or surfaces of biological chips for parallel processing of DNA samples, or surfaces of small aspheric lenses) are well familiar to a person of skill in the art, and do not require any particular discussion.

Specific examples of a surface that is discretized and almost necessarily requires a high-NA optics may be found, for instance, in the applications of a lithographic exposure tool or digital scanner, when a conventionally-used fixed-pattern mask or reticle that travels on a reticle-stage is replaced with a MEMS device such as one containing an array of mirror elements (also referred to herein as a mirror array or spatial light modulator, SLM). The surface of such mirror array is discretized into individual mirror elements. Dimension of a SLM-based phase-mask in a lithographic exposure tool may be as large as about 500 mm×15 mm in one example, and the FOV subtended by such SLM is much larger than a FOV of a typical microscope objective utilized in a vertical scanning interferometer. Mirrors in the array may be configured to move or reposition discretely or continuously along a line transverse to a surface of the device between the two extreme positions characterized by two corresponding height values with respect to a chosen reference level. The two height levels may be chosen to be $\pi$-phase apart at a given wavelength of light incident onto a given mirror of the array, thereby defining the whole array of the mirrors to operate as a phase mask. While such MEMS device (configured as a phase mask or reticle with respect to light incident upon it) may be fixed in place, it may be programmed to move a spatial pattern of distribution of individual mirror(s) across the mirror array, for example in a fashion synchronized with the motion of the wafer in the exposure tool. Should a mirror element fail, the pattern of the phase mask changes as compared to the desired or pre-determined pattern, and should not be transferred to (printed on) the wafer. Understandably, the ability to measure the phase (or displacement) of each individual mirror element of such phase mask to determine if it is working properly, both "on" and "off" of the digital scanner, is of operational importance.

Figure 3B:
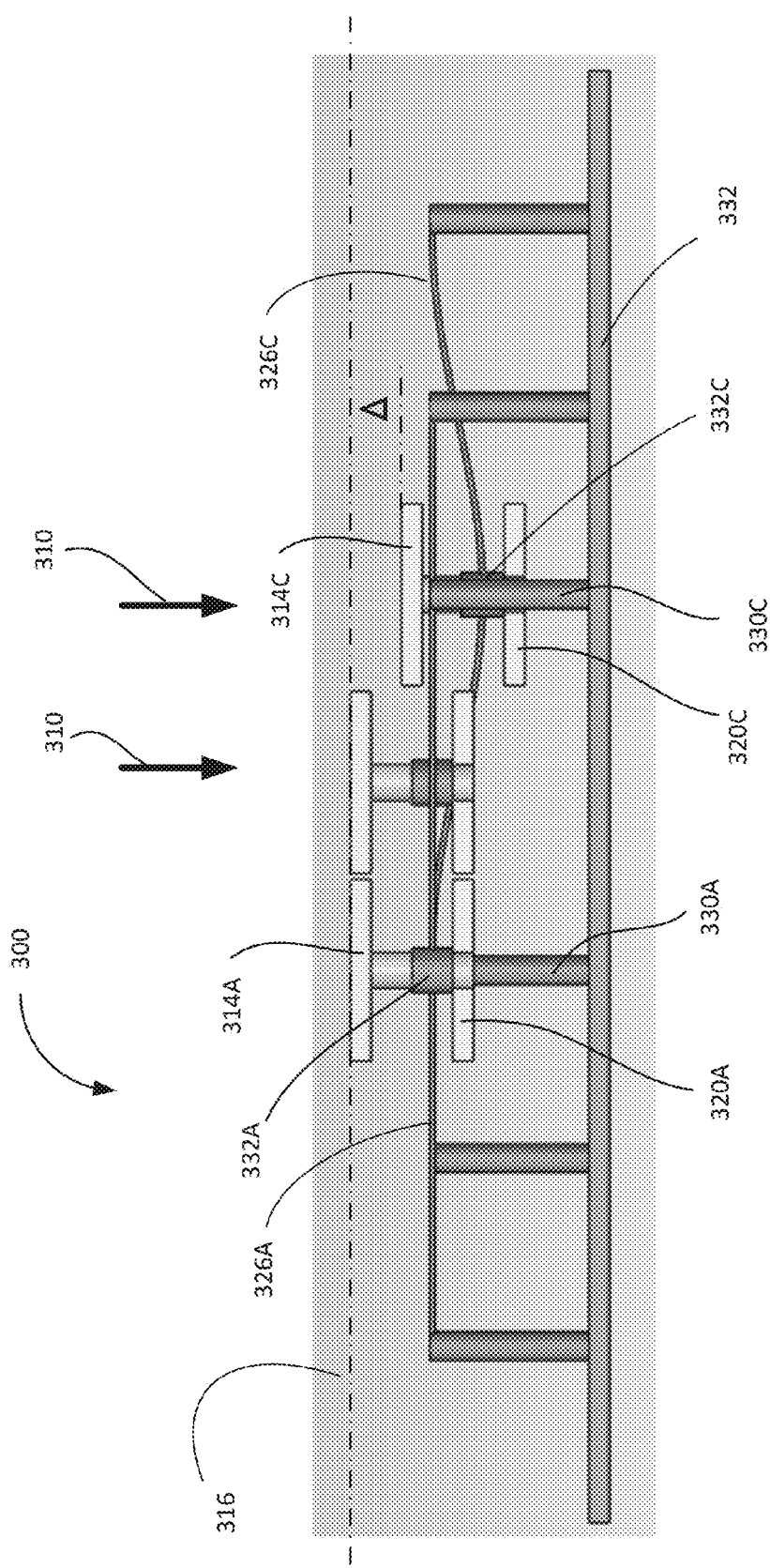

FIGS. 3A, 3B illustrate schematically a particular non-limiting example 300 of an SLM containing an array of individual mirror elements each of which includes an upper mirrored or simply reflective surface (314A, 314B, 314C) and a lower electrode surface. The transverse translation of an individual mirror can be effectuated, for example, based on the principle of electrostatic attraction and/or repulsion between an individually-addressable electrode with which a given individual micro-mirror is equipped and a based electrode that is common to all the mirrors of the device 300. The individual electrode 320C of the mirror 314C and the base electrode 322 provide but one example of the implementation of such concept. In this example, by applying an appropriate difference of potentials between the electrodes 320C, 322 sufficient to create an electrostatic force that overcomes the tensional load provided by mechanical resistance of a spring 326C juxtaposed with the mirror 314C, the mirror 314C is caused to move towards the base electrode 322.

Depending on particular details of the structural implementation of the embodiment 300, such movement may be effectuated, for example, in a sliding fashion provided by a sleeve 332C encircling the fixed support-pole 330C and, optionally, connected to the spring 326C such as to increase the potential energy stored in the spring 326C. In another example (not shown), the pole 330C may be configured as a component affixed to the micro-mirror 314C and moveable with respect to the electrode 322, in which case the movement of the micro-mirror 314C may be coordinated with the corresponding movement of the support-pole 330C in a piston-like fashion, transversely to the device surface 316. Other implementations of an individual micro-mirror direction-reversible translation in a direction transverse to the surface of the phase-modulating embodiment of the invention can be readily envisioned by a skilled artisan.

In a specific situation where the incident light 310 has a wavelength of about 193 nm, a dimension of a given micro-mirror 314A, 314B, 314C may be on the order of a few microns (for example, of about 2 microns by 2 microns, or 4 microns by 4 microns, or 6 microns by 6 microns), and the maximum range transverse displacement $\Delta$ may be on the order of 40-50 nm or so. In operation, a phase-modulating embodiment such as the embodiment 300 of FIGS. 3A, 3B, imparts variable across the lightfront (light wavefront) 310 phase-shift as a function of a voltage level corresponding to such micro-mirror.

(2) Examples of Embodiments of the Measurement System of the Invention

The idea of the invention stems from the realization that a surface of a large (multiply-exceeding the FOV of the used optical objective) sample can be spatially profiled (with a resolution on the order of 1 nm or better—in one implementation, measured as 0.14 nm 1$\sigma$—along a z-axis normal to the surface) with an interferometric set-up configured to scan the SUT along the plane of the SUT and in absence of any phase-shifting operation or activity (as defined in the art) effectuated along the z-axis or an axis transverse to the plane of the SUT. Such in-plane scanning interferometer is configured to form, across the sensitive surface of the optical detector, interferometric fringes that are judiciously tilted with respect to the direction of the in-plane scanning. The non-zero angle of tilt or inclination between the interferometric fringes and the direction of lateral scanning of the sample in a plane of the sample surface is either acute or obtuse (depending on the point of view). In other words, the angle formed between a vector that is collinear to the direction of motion of the SUT in the image of the surface of the SUT formed at the detector, and a line representing constant optical path difference between the test and sample arms of the interferometric set-up used in an embodiment of the invention has a non-zero value.

Figure 4:
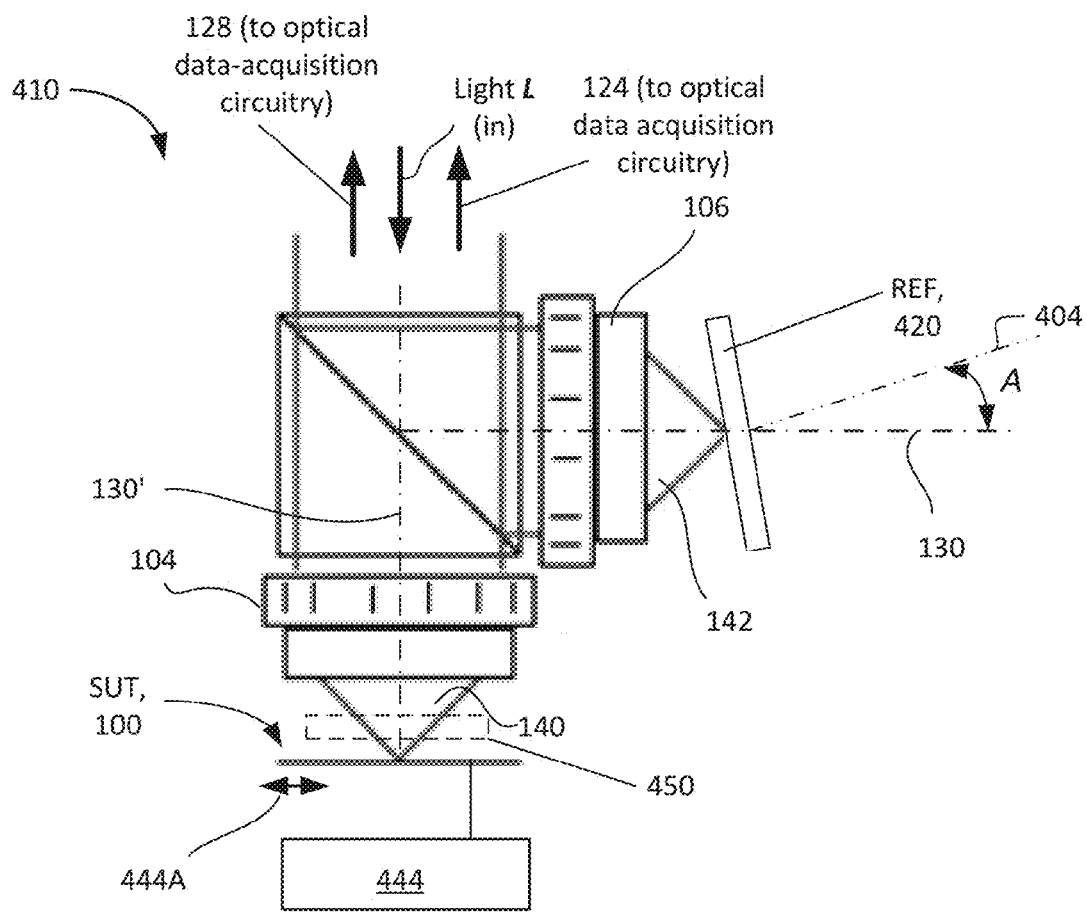
FIG. 4 illustrates an embodiment of an in-plane scanning interferometric setup of an embodiment.

In the example of FIG. 4, the embodiment 410 of an in-plane scanning interferometric setup is shown configured in a fashion similar to that of the Linnik interferometer structure. Here, the reference mirror 420 of the in-plane scanning interferometer 400 is intentionally and necessarily tilted about the y-axis and with respect to the optical axis 130, 130' (the axis perpendicular to the SUT) such as to form at least 1.5 full-period interferometric fringes across the surface of the optical detector at a non-zero angle with respect to the direction of in-plane scanning (shown as x-axis in this example). Such tilt fringes across the FOV are used to introduce the desired phase difference between the neighboring areas of the SUT. The angle of tilt of the reference surface (reflector) 420 about the y-axis is shown as A between the normal 404 to the reference surface 420 and the local optical axis 130. It is appreciated that a differently-configured interferometric setup can be used for the same purpose, such as a Michelson setup or a Twyman-Green setup, to name just a few.

The structure and operation of the embodiment 410 (and, in particular, the reflector 420) is devoid of and does not employ a z-stepping or z-scanning capacity (as defined herein, during the instantaneous measurement of a chosen location of the SUT) or phase-shifting operation (along the z-axis as understood in the art). Instead, it is equipped with an appropriate (electro)mechanical means (such as a piezo-based or otherwise configured micropositioner 444) configured to move, for example, the SUT 100 along a plane of the SUT 100 ("in-plane scanning" with respect to the SUT) in the scanning direction of the x-axis, as indicated with an arrow 444A. (In the alternative, the interferometric setup 410 as a whole can be moved with respect to a fixed SUT 100, which does not change the principle of operation of the embodiment). At the same time, the embodiment 410 may be equipped with an appropriate repositioner configured to slowly and, optionally, contemporaneously with the in-plane scanning motion 444A change a position of the SUT along the z-axis at a speed comparable with or even slower than the speed of in-plane scanning. Such capability to track the change of profile of the continuous or quasi-continuous SUT becomes useful to ensure that the instantaneously-measured location at the surface of the SUT remains within the depth of focus (DOF) of the objective 104, because the SUT is scanned in the x-direction across a distance exceeding the typical instantaneous field of view of the measurement system by at least 10 to 100 times or more. Since the alignment of the SUT with respect to tip and tilt, necessary to keep the surface of the SUT within the limited focal range of a high NA optical system, is likely to become about 100× tighter (if the overall, operational FOV is extended by 100× as a result of the scanning employed here), the proposed technique mitigates the risk by moving the sample in z-direction as it scans in-plane (along the x-direction) to keep the fringes in approximately the same location all the time. A skilled artisan readily appreciates that such capability simply does not qualify as and is different from the phase-shift-enabling z-scanning capability of vertical scanning interferometers of related art. Moreover, such z-movement is effectuated after the informational feedback is already determined from the interferometric images and is not predetermined; further, the accuracy level of such z-movement is on the order of 50 nm or so and is simply insufficient to support the piezo-based phase-shifting, that requires the accuracy of below 1 nm.

(3) Scanning of an SUT.

In addition to addressing problems associated with the vertical scanning white-light interferometric profilometry discussed above and, notably, in advantageous contradistinction with related embodiments of lateral scanning interferometers, an embodiment of the invention requires that the local optical axis 130' be substantially normal—and not tilted—with respect to the surface of the SUT 100 to avoid considerable shortcomings of operation, almost inevitably present otherwise, as would be readily understood by a person of skill. (Phrased differently, in an embodiment of the invention there is no angular tilt between the interferometric objective and the sample stage). In particular, the operation of a related device in the situation when the axis 430' and the normal to surface of the SUT 100 are not substantially parallel to one another, as will be readily appreciated by a skilled artisan, the use of the device at high levels of optical magnification (in one example—above about 100×, when a typical objective may have a working distance of 1 mm or less) required in practice becomes extremely limited if not impossible due to the prospect of mechanical interference between the sample and the microscope objective (the latter typically having a small working distance at high magnification and high NA). Furthermore, at the edges of the FOV of the objective 104 in such situation the surface being measured ends up out of focus, as a result of which the spatial resolution of in-plane scanning is sufficiently sacrificed. Moreover, the measurement system responds differently to spatial changes in local slopes (inclinations) of the surface of the SUT 100 depending on the sign of such changes (that is, whether the slopes are upwards or downwards, positive or negative) due to the overall tilt of the instrument. When the axis 430' and the general normal to the surface of the SUT 100 are not substantially parallel to one another, the measurement technique described in related art simply cannot accommodate the unwanted motion of the SUT along the z-axis during the lateral scan, unlike that described in the present application. (Specifically, the related art describes setting the system up so that there is a known phase shift between measurements of a given SUT location as it moves across the FOV of the objective of the interferometer. The data-processing algorithm(s) of the related art require a consistent phase step, and produce an error each time an "unwanted" motion along the z-direction would cause a different phase step, or operational inconsistency.) Additionally, unlike lateral white-light scanning interferometers of related art, for example (where the exact sample profile can be recovered only if the angle of tilt between the sample stage and the interferometric objective in known accurately because the height of a sample surface varies linearly with the tangent of the tilt angle), embodiments of the present invention is free of the need for a tilt angle calibration required by each measurement.

In a specific implementation, when the SUT includes an array of mirrors comprising an SLM device, the reference reflector may be inclined with respect to the optical axis 430 such to form interferometric fringes tilted with a slope corresponding to about π/2 phase between the neighboring mirror elements of the array of mirror elements. In a specific case, when the SUT 100 includes an array of 4-by-4 micron mirror elements or pixels (such as elements 314A of FIG. 3A, for example), and for light L at a wavelength of λ=650 nm, such as slope corresponds to about 81 nm of optical-path difference between the immediately neighboring SLM pixels, and to A~0.58 degree. In a different implementation, the tilt angle of interferometric fringes can be chosen to correspond to λ/8 (A~0.29 degree).

Figures 5A, 5B, 5C:
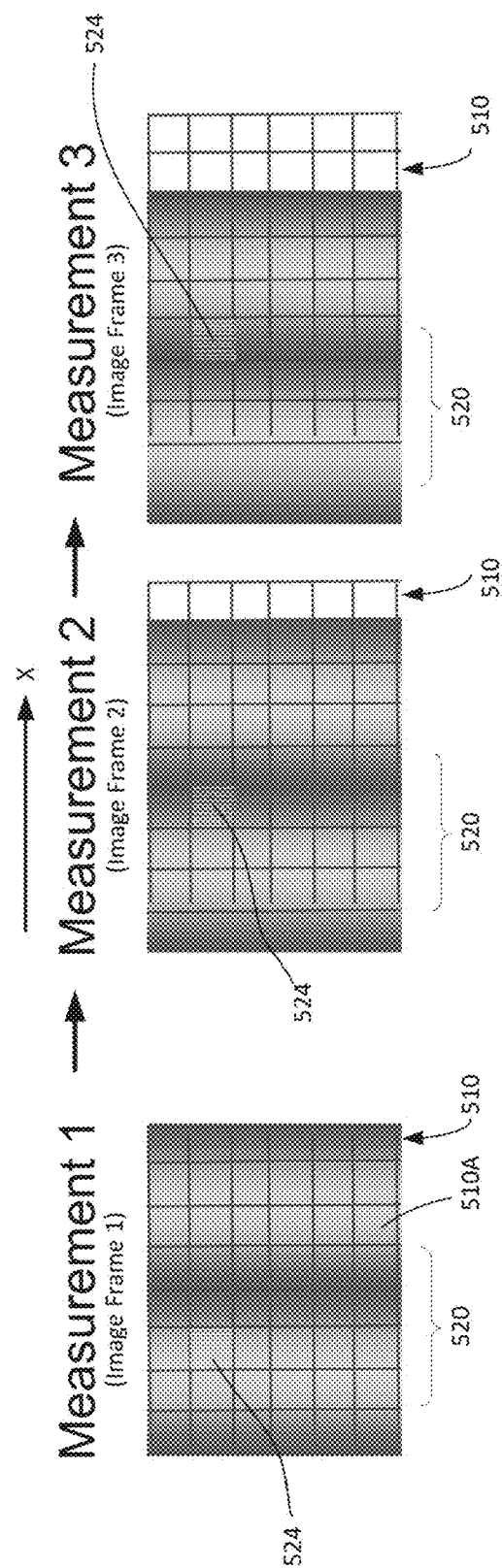
FIG. 5A, 5B, 5C illustrate the repositioning of the sample under test (SLM) in a plane parallel to the plane of the sample under test in accord with operation of the in-plane shifting interferometer of an embodiment of the invention.

In one example, if a CCD pixel has an actual side dimension of about 200 nm (in the optical space occupied by the SUT, interchangeably referred to as "object space"), then each of the individual SLM mirror elements of a 4×4 square microns is measured by 20×20 CCD pixels at each image frame. In order to measure a z-position (position along an optical axis) of an individual mirror element, during the operation of the embodiment the SLM (SUT) 100 is translated (scanned) along the plane of the mirror array with the use of positioner 444 in the direction of the tilt of fringes (x-axis, direction of in-plane-scanning) as images are captured such that an increment of an in-plane translation of the SUT 100 corresponds to an integer number of the pixels of the CCD camera (optical detector). This is schematically shown in FIG. 5A, 5B, 5C illustrating three sequential positions of the SUT (in this case, the SLM 510), shifted with respect to one another in-plane of the SUT along the x-axis by the distance d (chosen, in this example, to be equal to a side-dimension of an SLM pixel or an individual mirror element of the SLM). Here, the grid 510 represents an array of individual mirrors of the SLM and each of the squares 510A of the grid 510 represents one individual mirror of such array. A full interferometric tilt fringe, formed at the optical detector and shifting its position in relation to the position of the array 510, is shown as 520. (If there is no z-motion of the SUT, then the fringes stay at the same location relative to the camera pixels during the x-scan.) In this example, the interferometric fringes are tilted with respect to the scanning direction x by about 90 degrees. As the in-plane scanning procedure progresses across the whole x-range of the SLM device with in-plane incremental shifts such that each SLM mirror element (one of which is shown as the element 524) is measured with different pixels of the CCD camera, each of which is located along the same row of pixels of the CCD camera. As a result, a chosen element of the SUT traverses the entire FOV while being measured with light incident thereon at a variety of phases due to the tilt of the reference reflector 420.

Depending on a particular implementation, the measurement of the operational states of the SLM mirror elements in their discreet positions can be done in any of at least three ways: a) switching or changing the operational state of the SLM between the discreet positions (state 'A' and state 'B') at every position (each x-location) of the interferometer above the SUT while such position is fixed (that is, during a given in-plane scanning step), thereby taking two measurements at each location of the raster scan of the SLM, or b) completing the full raster scan of the SLM being in one state (e.g., state 'A'), shifting the SLM mirror states (into state 'B'), and then repeating the whole process, or c) changing the state of the SLM between two states between every two consecutive camera frames, so that the odd numbered camera frames correspond to state 'A' and the even numbered camera frame correspond to state 'B', as the SLM is scanned at a constant velocity.

Figure 6A:
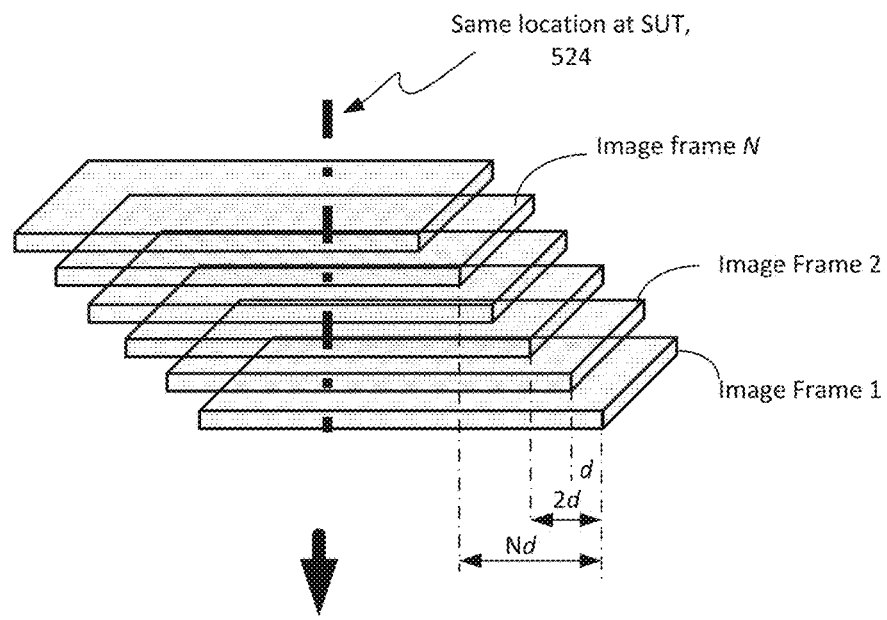
FIGS. 6A, 6B illustrate a principle of data acquisition according to an embodiment of the present invention in which (in contradistinction with the data acquisition of the vertical shifting interferometer, FIG. 2A, which provides only the phase-shift information representing a shift along the z-axis) both a phase-shift information and information about a spatial shift along the x-axis (in-plane shifting) are stored.
Figure 6B:
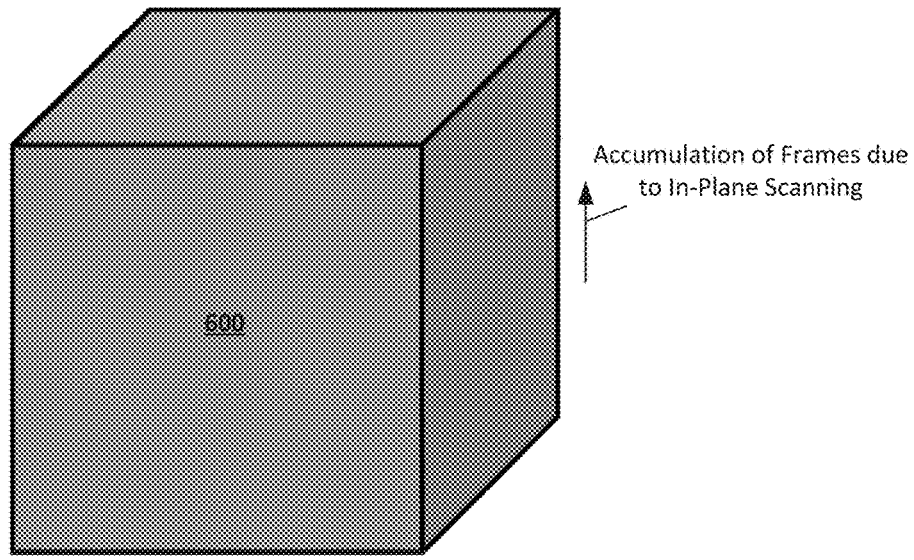

As a result of such sequential measurements, the 3D cube 600 of optical data is acquired, as shown schematically in FIGS. 6A, 6B in which (in contradistinction with the data cube of FIG. 2A that is acquired during the conventional measurement and containing only a phase-shift information) both a phase shift information and information about a spatial shift along the x-axis are stored. Such data mapping can be implemented with the use of, for example, a least-squares phase estimation algorithm (sometimes referred to in the art as a LSPSI algorithm). As illustrated in FIG. 6A, for example, each of the individual data frames represents the profile (of the SLM sample under test) that is shifted by an in-plane spatial-shifting increment d with respect to the profile represented by an immediately preceding or immediately following data frame. Here, d corresponds to an integer number of camera pixels (after taking the magnification of the optical system into account). Since the dimensions of each of the individual data frames are the same, the data cube is constructed as a result of alignment of multiple mutually-shifted data frames.

A distribution $\alpha_i(x,y,t)$ of the SUT-profile is found for each camera frame (image frame) and a best-fit plane ($\theta_x$, $\theta_y$, z), described by tip, tilt, and a mean z-value, is also found for each image frame. This distribution represents the path of the SUT through space as it scans (is scanned) in-plane (with results being fed into the LSPSI algorithm to improve the estimates of the actual phase shifts used during data collection, which in turn improves the resulting determination of the phase map shown in Equation 4, below). The value of $\alpha_i(x,y,t)$ is computed for every frame and every pixel in the data cube; this value is based on the expected trajectory of the SUT as well as the changes that are measured during data collection by assessing each camera frame to determine ($\theta_x$, $\theta_y$, z) as a function of time. The B-matrix elements are computed as weighted sums of the measured irradiance I of light $$B = \begin{bmatrix} \sum I_i \\ \sum I_i \cos\alpha_i \\ \sum I_i \sin\alpha_i \end{bmatrix} \quad (1)$$

and the A-matrix elements are computed as $$A = \begin{bmatrix} N & \sum \cos\alpha_i & \sum \sin\alpha_i \\ \sum \cos\alpha_i & \sum \cos^2\alpha_i & \sum \cos\alpha_i \sin\alpha_i \\ \sum \sin\alpha_i & \sum \cos\alpha_i \sin\alpha_i & \sum \sin^2\alpha_i \end{bmatrix} \quad (2)$$

where N is the number of measurement values at a given location of the SUT.

The phase φ (and, correspondingly, physical height) of a surface feature can then be determined from the vector $$a = \begin{bmatrix} a_0 \\ a_1 \\ a_2 \end{bmatrix} = A^{-1}B \quad (3)$$

as $\tan\varphi = a_2/a_1$. $\quad (4)$

It is understood by a person of skill in the art, therefore, that embodiments of the invention provide an apparatus for profiling an SUT. Such apparatus includes, in its simplest form, a beam splitter positioned to divide a light beam from a light source into a measurement light beam and a reference light beam directed along a reference axis; and a reference reflector positioned in an optical path of the reference light beam, the reference reflector being inclined with respect to the reference axis. The beam splitter is oriented to direct the measurement light beam towards the SUT to irradiate the SUT and to form a reflected measurement light beam directed to pass through the beam splitter to interfere with the reference light beam upon reflection thereof from the reference reflector. In a specific case, a normal to the reference reflector crosses the reference axis. The apparatus also includes a measurement objective disposed between the beam splitter and the SUT to converge the measurement light beam incident onto the measurement objective from the beam splitter; and a reference objective disposed between the beam splitter and the reference reflector to converge the reference light beam incident onto the measurement objective from the beam splitter. The apparatus further includes a positioner (in operable cooperation with at least one of the apparatus and the SUT) that is configured to change a positional relationship between the apparatus and the SUT at least in a chosen direction (and, in a specific case, to move the SUT at least in such chosen direction). An axis normal to the reference reflector lays, in one specific implementation, in a plane that contains both the reference axis and the measurement axis. In a related implementation, the first direction is defined by a vector that lays in the same plane. In addition, the apparatus includes a detector configured to detect light distribution formed as a result of optical interference between the measurement light beam and the reference light beam. Alternatively or in addition, the detector may be configured detect such light distribution while the positional relationship is being changed.

(4) Examples of Empirical Results

In one implementation, an in-plane scanning interferometric setup discussed in Secs. (3), (4) was built using two optically-matched objectives 104, 106 with NAs=0.6. The reference surface 420 was tilted about the y-axis to introduce tilt fringes (in a related embodiment, additional tilt of the reference surface 420 about x-axis may also be introduced).

The temporal coherence of the light source chosen for the experimental setup is preferably long enough to maintain contrast over the tilt range across the FOV, or at least across a large section of the FOV. In one implementation, a commercially-available LED generating light at about 650 nm provided light L with operationally-sufficient characteristics. In another implementation, a light source included a superluminescent diode (SLD) with a spectral bandwidth of about 8 nm to 100 nm FWHM, the light output from which was coupled into a single-mode optical fiber with a core diameter of about 4 microns, providing temporal coherence length of about 40 microns for light delivered to the experimental setup.

Figure 7A:
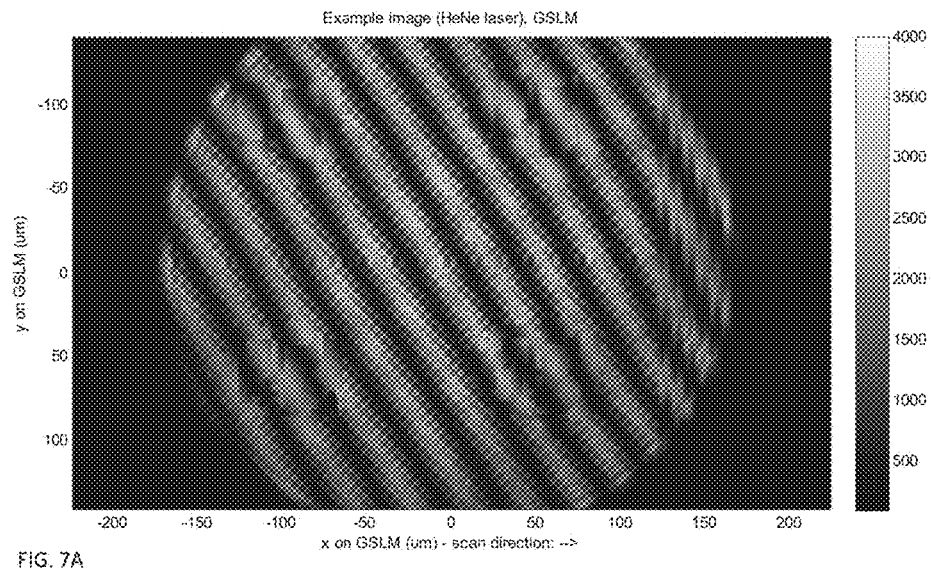
FIG. 7A illustrates interferometric tilt fringes registered by the optical detector of an embodiment of the invention as a result of judicious tilt/tip of the reference reflector of the embodiment, required for the operation of the embodiment.

An example of an image of an area of the SLM sample under test, positioned in the embodiment of the in-plane-scanning interferometer according to the idea if the invention with the reference reflector 420 appropriately aligned in tip and tilt (as evidenced by the clearly visible tilt interferometric fringes, required for the measurement according to the idea of the invention) under illumination L delivered from the He—Ne laser source, is shown FIG. 7A. Following the alignment of the interferometer, the SLD source ($\lambda$=650 nm) was employed to set the optical path difference along the z-axis between the SUT 100 and the reference reflector 420 to ensure such OPD is below the coherence length of the SLD-generated light. In some situations it may be beneficial to choose the light source with a relatively low coherence length to reduce the number of coherent stray beams of light and diffraction effects that otherwise may be registered by the optical detector during the operation of the embodiment and increase the optical noise irrelevant for the purposes of the measurement of the SUT. The SUT 100 (configured as the SLM with individual square mirror elements having side dimensions of 4 microns in object space) was then translated incrementally, as discussed in Sec. (3), in the direction of the tilt (x-axis), by a known integer number of optical camera pixels between each measurement, such that each location on the SLM surface was measured multiple times with a variety of fringe phases (as discussed above in reference to FIGS. 5A, 5B, 5C, 6A). Notably, for the embodiment of the invention to operate, the phase steps in x-direction do not have to be of a particular value as long as the value(s) of phase step(s) is/are known, thereby providing a clear advantage over and lifting an important operational limitation of the vertical scanning interferometer(s). However, it may be preferred to avoid in-plane stepping in x-direction in exact integer multiples of pi (in a case this precaution is not taken, the multiple measured values would correspond only to 2 different irradiance values and there may be not enough information available to calculate the phase associated with a point at the SUT surface). Notably, the actual values of the in-plane phase steps can be found from the images acquired with the optical data-acquisition circuitry of the embodiment.

During the in-plane scanning in the x-direction, camera images were captured at a constant sampling rate. Here, the x-shift accuracy requirement was measured to be within the range and on the order of 50 nm to about 100 nm, which is at least one to two orders of magnitude less restrictive than that of a conventional vertical scanning (z-phase-shifting) interferometer. It is noted that, in contradistinction with the white-light interferometry, which measures the peak of the coherence envelope (apodization envelope) of the interferometrically-formed light distribution at the optical detector, an embodiment of the present invention is based on the measurement of contrast of interferometric fringes (corresponding to optical path difference of zero between the reference and test beams 142, 140). More specifically, an embodiment of the present invention is configured to determine the surface position based on pre-determination of phase information about interferometric fringes formed as a result of operation of the employed optical system.

Figure 7B:
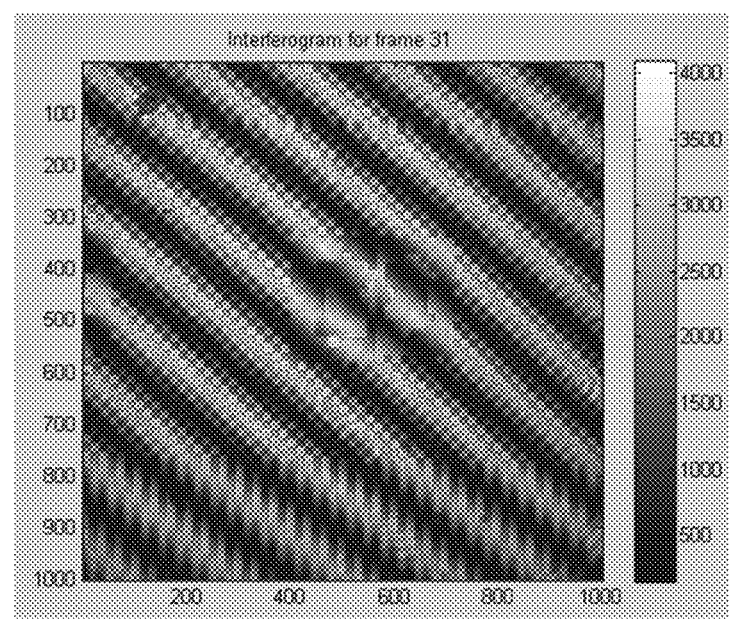
FIG. 7B illustrates the image of the SUT captured by a 1,000-by-1,000 camera pixel section at a chosen location of the SUT during the in-plane scanning.

In one implementation, the optical data were collected with the in-plane incremental shift corresponding to either 17 or 34 camera pixels per frame. For simplicity, a 1,000-by-1,000 camera pixel section of each image was used at each location of the SUT during the in-plane scanning in the LSPSI algorithm, an example of which section is show in FIG. 7B. In the example of FIG. 7B, the in-plane shift of 34 camera pixels amounted to approximately 29 measurement data points for each of in-plane increment locations of the SUT. It was empirically discovered that for a typical exposure time of about 1 microsecond and a rate of 15 fps, the time increment between consecutive frames was about 66 ms and the resulting image blur due to integration of the signal in the scan direction during the typical exposure time of about 0.05% of a size of an individual camera pixel was practically negligible.

Figure 8A:
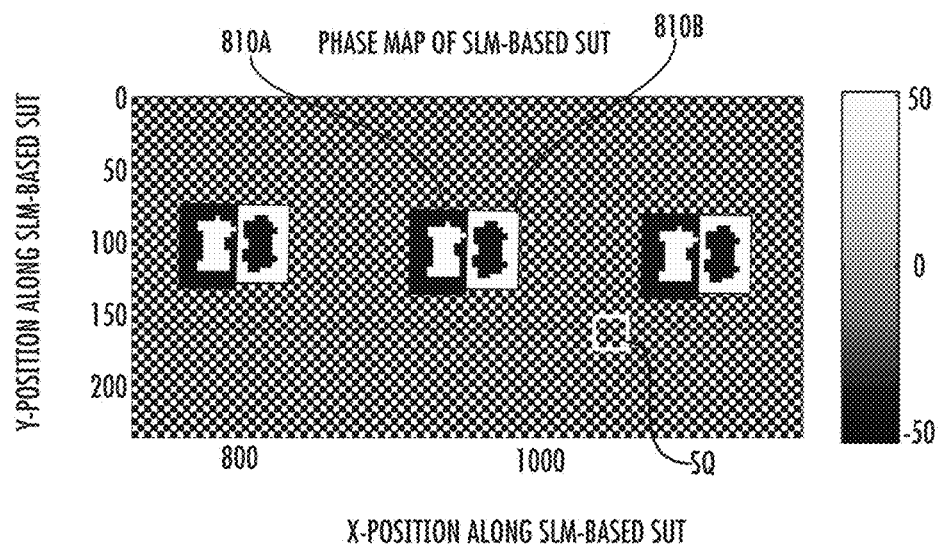
FIG. 8A is a portion of an image of the surface height of the SLM-based SUT, obtained as a result of the in-plane scanning of the SUT along a 1 mm distance in x-direction.

In a related example, the analysis of the optical data, collected via optical projection of each of the 4-micron-perside SLM-based SUT pixels onto an area of about 17-by-17 camera pixels, produced phase maps of such SUT. An example of an portion of one of such phase maps is shown in FIG. 8A. In this experiment, the full distance of the SUT scanned along the x-direction was about 1 mm, which took about 15 seconds due to the high sampling density (number of data points) and low frame rate. The FOV of the objective 104 was about 300 microns at the SUT.

Figure 8B:
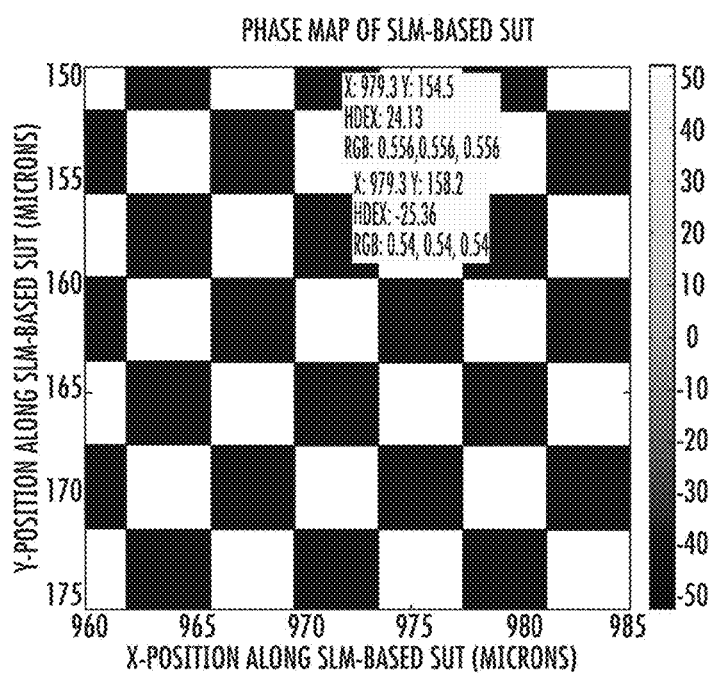
FIG. 8B is a 25×25 square micron subsection (marked as SQ) of the image of FIG. 8B.

While the +x and −x edges of the image appear to be noisy due to the limited amount of data points taken at the beginning and end of the scan, such artifact does not change the principle of operation or operability of the embodiment(s) of the invention and, in practice, is easily solved by scanning beyond the limiting edge (or boundary) of the SUT. The height of the surface of the SUT in nanometers may be assessed from the color-bar of FIG. 8A. However, the smaller, 25-by-25 square micron area of the same image shown in FIG. 8B provides a better assessment of the phase map and evidences that the measured height of the SLM elements is about 48 nm. (It would be appreciated by a skilled artisan that that the absolute value of the height of the surface element derived from a phase map generally depends on the mean wavelength of the employed light source.)

Overall, in this embodiment a surface profile of an approximately 16×16 mm$^2$ area of the SUT (configured as an SLM similar to that described in reference to FIGS. 3A, 3B) was measured with sub-nm axis (z) resolution and sub-micron lateral resolution in about 15 seconds.

It is appreciated that in a related implementation of the measurement process, two scans of the same SUT can be performed, one spatially-shifted with respect to another by a distance corresponding to a predetermined number of in-plane shift increments (in this example, by an odd number of 17 camera pixels, or 1 individual mirror element on the SUT) to obtain two phase maps of the SUT. A subtraction of the image representing one of these two phase maps from the image representing another phase map facilitates an assessment of the phase difference between neighboring elements of the SUT. In the case of the SLM-based SUT of this example (the mirror elements of which could be in only two height states: either at 0 nm height or at 48 nm height), the implementation of such related measurement empirically proved that the difference between one SLM element and its neighbor was described by one of 3 operational states: +48 nm, 0, or −48 nm.

Figure 9C:
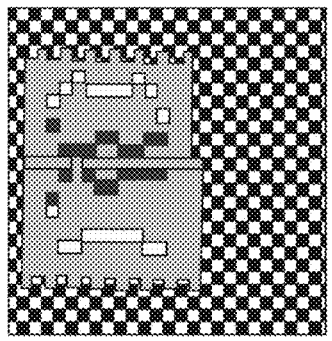
FIG. 9C illustrates a third phase map resulting from the subtraction of the map of FIG. 9B from the map of the FIG. 9A.
Figure 9B:
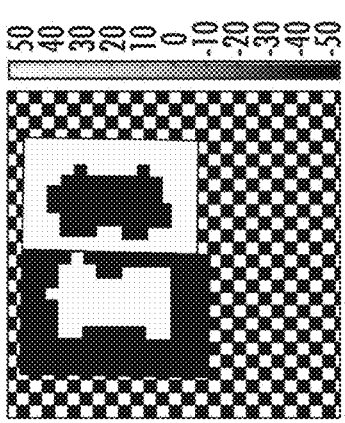
FIGS. 9A and 9B illustrate first and second phase maps constructed based on interferometric measurement of the same surface of the SUT with an embodiment of the invention but respectively started at first and second locations separated from one another, along the direction of in-plane scanning (x-axis) by one increment of the in-plane shift along the x-direction.
Figure 9A:
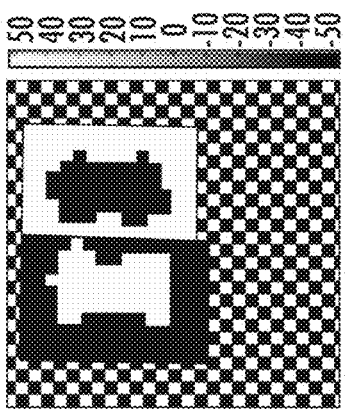

The empirically obtained first and second phase maps of an area of the SUT are illustrated in FIGS. 9A, 9B, while the phase map representing the subtraction of the second map from the first map is shown in FIG. 9C. The subtraction of the first and second phase maps provides the difference between neighboring SUT mirror elements.

Referring again to the measurements described in reference to FIGS. 8A, 8B, 9A, 9B, 9C, the standard deviation of the height measurement of the surface of the SUT can be computed based on the examination of a gray area of the surface (such as, for example, any of areas 810A, 810B) across which the surface is substantially flat and no phase difference can be measured over the distance corresponding to several SLM pixel elements.

In practice, the standard deviation 1σ was measured to be about 2.3 nm at a single camera pixel. The repeatability of an SLM height measurement is then determined as $$1\sigma / \sqrt{\text{area of camera onto which an SLM pixel is imaged}} =$$
$$1\sigma / \sqrt{17*17} = 2.3 \text{ nm}/17 = 0.136 \text{ nm}.$$

Figure 10:
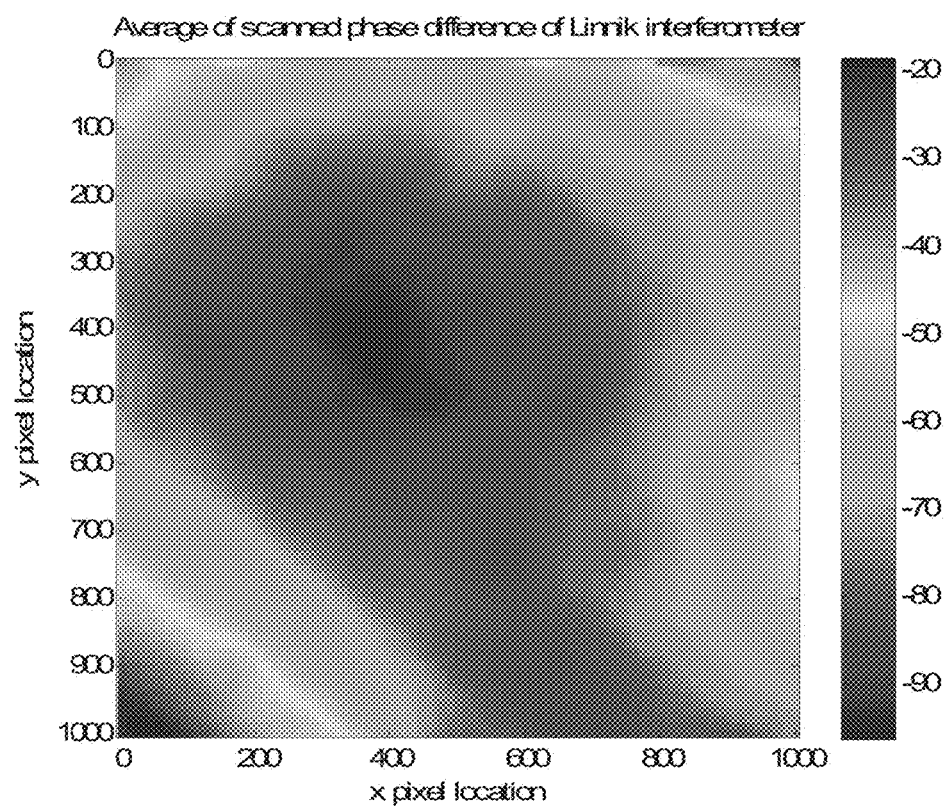
FIG. 10 is a contour plot illustrating the phase error present across the image of the SUT, acquired during the operation of the in-plane scanning interferometer of the embodiment and caused by the wavefront mismatch between the two arms of the interferometer.

Referring again to the phase map of FIG. 8A, the experimentally observed roll-off of the height measurement in a direction orthogonal to the scan direction (that is, in the y-direction) as well as the variations in the corners of the image can be explained by the fixed phase difference in the embodiment of the in-plane interferometer that gets added to the phase representing the surface topography and the orientation of the GSLM due to motion of the stage. While this fixed phase value would be zero across the field of view if the two objectives 104, 106 were ideally optically matched, in practice it is non-zero. One way to estimate this residual value is to average the phase of each frame during the x-scan after the resulting phase map is low-pass filtered and the tip/tilt are removed. The results of such data processing operation is shown in FIG. 10, representing the optical wavefront mismatch between the two arms of the embodiment of the interferometric set-up according to the idea of the invention, from which a phase error of the measurement along the axis perpendicular to the direction of the in-plane scan can be derived. The estimation of such error may be improved further by forming a phase map of a flat, pattern-free reflector used as a reference SUT, storing the reference data on a tangible computer-readable non-transitory medium and then adding these data to the estimates of $\alpha_i$ obtained from the measurement of the current SUT to further reduce the absolute error in the final phase map of the currently measured SUT.

Figure 11:
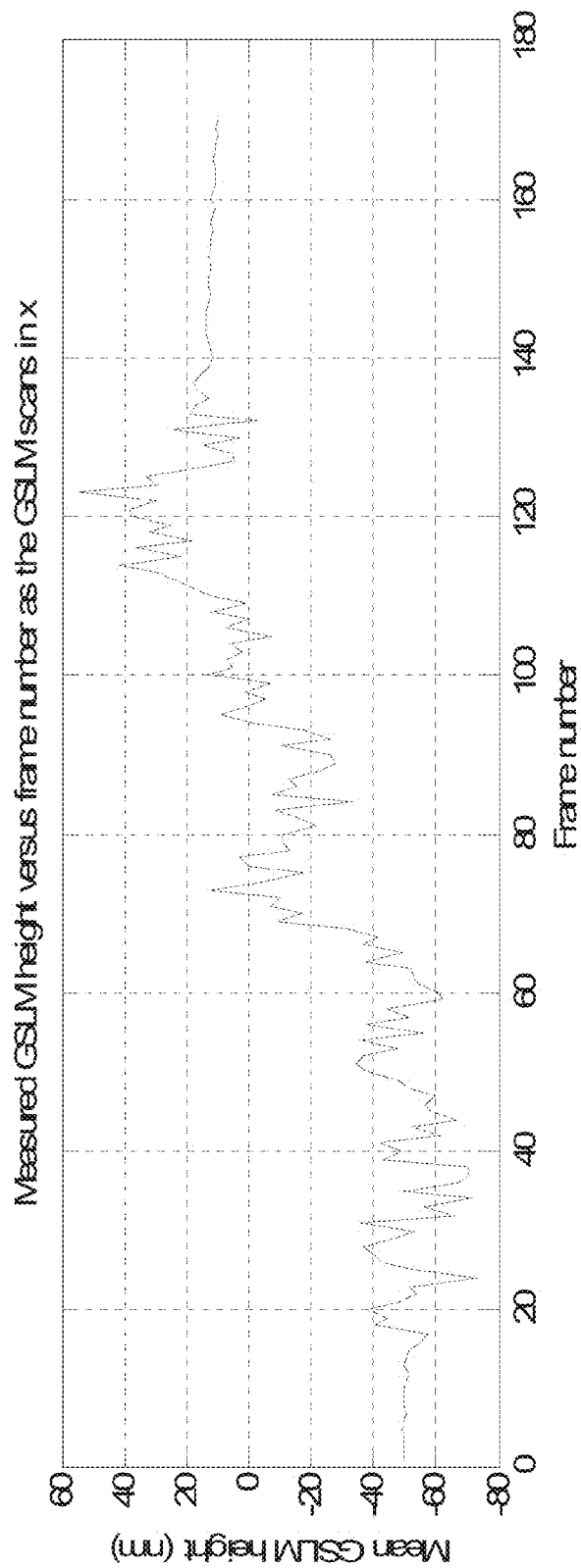
FIG. 11 is a plot illustrating the capability of an embodiment of the invention to track the deviation of a portion of the surface of the SUT that is being measured at the moment from the ideal location at the focal plane of the objective of the test arm of the in-plane interferometer.

In practice, to improve the estimates of a phase map $\alpha_i$(x, y, t) representing the results of the measurement of the surface of the SUT—whether a quasi-continuous surface or a discretized surface such as that of the SLM—with the embodiments of the in-plane scanning interferometer of the invention, a phase map may be created for each image frame, see FIG. 6A, captured with the camera and a best-fit plane ($\theta_x$, $\theta_y$, z) may be found for each image frame. While keeping the surface of the SUT in focus throughout the scan may be preferred, the above-described capability of the embodiment to track the slow slopes of the SUT surface and/or deviations of it from the focus of the objective 104 (which tracking is incomparably slow in comparison with and does not qualify as z-scanning of the vertical scanning interferometer) may be incorporated into one of the embodiments. FIG. 11 illustrates a typical (albeit having a strong noise component due to the use of an inexpensive translation stage) z-deviation of the surface of the SUT from its ideal position at the focal plane of the objective 104 (shown in the plot as "mean height" of SUT, also known as z), which can be discovered during the scan from one image frame to another.

The width of the coherence envelope, apodizing in practice the intensity distribution representing the interferometric fringes formed with the use of a scanning interferometer and, in particular, the reduction of width of such coherence envelop is related to the range of angles at which light is incident onto the SUT through the objective of the interferometer. The limitation of the range of angles of incidence of light onto the SUT can be attempted with the use of a contraption schematically illustrated in FIGS. 12A, 12B, and 12C, and will limit the reduction of the coherence envelope width. The spatial spread of light (a range of angles) reflected by the SUT will depend on the spatial frequencies present in the profile of the surface of the SUT. When the source is spatially large (for example, an LED source), the light distribution it produces in the pupil is spatially-substantial as well, and such source will illuminate the object from many different angles. In this case, the coherence envelope will reduce as a function of z, and pupil filters can be employed.

Figure 12A:
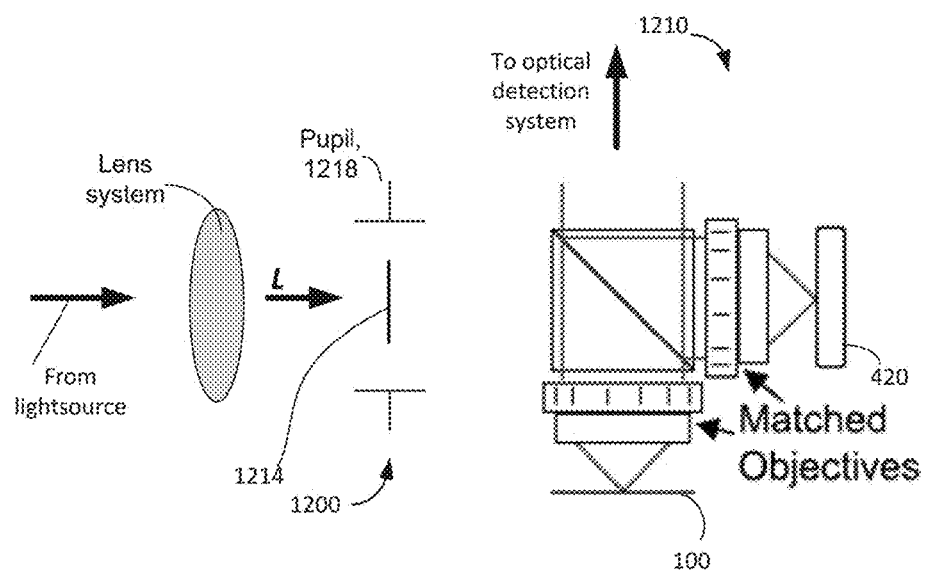
FIGS. 12A, 12B, 12C illustrate a related embodiment equipped with an optical obscuration element configured to increase contrast of interferometric fringes formed during the operation of an embodiment.
Figures 12B, 12C:
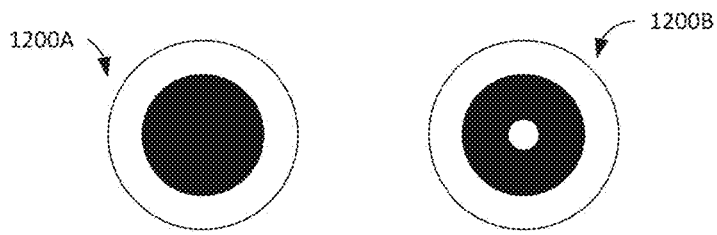

As shown in FIG. 12A, for example, an optical obscuration unit 1200 is placed across the substantially collimated input beam of light L arriving from the light source into the embodiments of the in-plane scanning interferometer of the invention 1210 (it is appreciated that operationally the delivery of light L from a different side of the beamsplitter of the interferometer 1201 as compared with a related embodiment 410 of FIG. 4 does not change the principle of operation of the embodiment). Two examples of the optical obscuration unit, 1200A and 1200B, are shown respectively in FIGS. 12B and 12C, and contain a respectively—corresponding version of an optically-opaque screen 1214 disposed in the plane of an optical diaphragm or aperture 1218. Portions of each of opaque screens of the embodiments 1200A, 1200B that are optically-opaque are marked black, while the light-transmitting portions are shown not colored. Accordingly, the width of the coherence envelope and, therefore, a degree of coherence of light incident onto the sample 100 is controlled by modifying a cross-sectional profile of lightbeam incident onto the sample 100. It is appreciate that generally, the optical density of at least one of optically-opaque section of the screen 1214 may be spatially uniform (that is, the value of it is the same at any point of the optically-opaque section of the screen) or non-uniform (when the value of optical density at a first point of optically-opaque portion of the screen differs from the value of optical density at a second point of optically-opaque portion of the screen).

Possible additional operational differences arising from the use of incarnations 1200A and 1200B of the obscuration unit stem from the conversion of the path difference into difference in height (surface profile), performed by the embodiment of the invention, which depends on the combined effects of the incident light at all angles. If the central portion of light input into the interferometer is fully blocked (as it would be with the implementation 1200A, then the sensitivity of the embodiment of the system to changes in height of the surface of the SUT is bit higher because the off-axis light experiences a larger path difference due to the non-normal incidence. With the use of the implementation 1200B, on the other hand, the axial (central) portion of the light input L is transmitted through towards the in-plane interferometer, and the net sensitivity is slightly reduced after averaging in the effects attributed to the on-axis light.

It is appreciated, therefore, that the proposed methodology employs a lateral scanning interferometric apparatus and procedure in which, rather than scanning the test sample or reference mirror along the optical axis to achieve traditional vertical phase-shifting, the reference mirror is tilted with respect to the optical axis to introduce tilt fringes across the field of view. Then, the test sample is scanned along the x-axis relative to the optical system. The phase shifting is done by examining the SUT at multiple locations during the scan and with different fringe phases, caused by the interferometric tilt fringes. The proposed technique allows the entire SUT to be measured incomparably faster (by at least 1 or 2 orders of magnitude or more) than with traditional step and z-phase shift methods. At the same time, in operation, the need in angle-calibration inevitably present in lateral scanning white-light interferometry is avoided by configuring the system of the such that angular tilt between the sample objective of the interferometer and the sample stage (or surface of the SUT being measured) is not present.

In order to ensure a practical range of phase change (of about $3\pi$) for measurement of a surface profile in a scan direction, it may be preferred that tilt of the interferometric fringes formed across the SUT by an embodiment of the invention as measured parallel to the direction of scan be no less than about 1.5 fringes. At the same time, the system is substantially free from any limitation on a phase change in a direction orthogonal to the direction of in-plane or lateral scan.

Continuous scanning of the SUT is effectuated along a scanning direction (discussed herein as x-direction) at a substantially constant velocity while camera images are captured at a constant sampling rate, providing the x-shift accuracy (on the order of 50 nm or so) that substantially less constraining operationally than that of about 0.5 nm to 5 nm required by a typical vertical scanning phase-shifting system. In operation, actual phase steps associated with the SUT surface profile can be found from the interferometric images acquired with the optical acquisition system. It is preferred to match the image frame rate of the optical camera to the scan velocity such that the image of the tested object is moved by an integer number of camera pixels at each frame.

In operation, the information about a drift of the surface under test from the best fit plane (a focal plane of the interferometric objective at each camera frame) is optionally used as feedback to a z-repositioner configured to keep the sample in focus during the lateral scanning measurement in a fashion that does not amount to and cannot be mistaken with that employed to achieve phase-shifting in a vertical scanning interferometer. This allows measurement of surfaces with profile departures from the focal plane of the objective greater than the depth of field (DOF) of the objective as long as such departures are not abrupt. In the present context, the term "abrupt" implies that the surface being measured does not have or is devoid of spatial discontinuities or steps larger than a quarter of the mean wavelength of light used to perform the measurement according to an embodiment and that, as a result of it, there is no 2pi phase ambiguity involved in the determination of the phase map. Alternatively or in addition, this term implies that even when the surface is spatially-continuous, its slope is not so large that light incident on it through the objective and then reflected misses (avoids) the numerical aperture of the microscope objective and is not captured by the sample arm of the interferometer.

In-plane scanning systems configured according to the idea of the invention facilitate surface profilometry at least in two measurement modes:

In one mode, directly producing a topography map of a SUT that is either unchanged or is operationally discreet and can be varied between different surface states (such as in the case of a MEMS-based device), the SUT is characterized in a state in which the surface is at the time of the measurement, without any changes to the surface, the height profile of a given location at the surface is determined relative to those at other locations across the surface. Here, correction for a "fixed OPD" error between the two arms of the interferometer may be employed, which includes (i) measurements along the direction of the in-plane scan and in an orthogonal direction in the same plane and/or (ii) calibration of the OPD error between interferometer arms.

In another mode, which may be particularly appealing for a measurement of a discreet, operationally-changeable surface such as that of a MEMS-based device, each location on the test sample is characterized relative to itself in two "opposite" or "negative to one another" states of such location (as defined by the operational states of an individual mirror of the MEMS-based device). Here, image frames obtained from the same location in two operationally-distinct states of the location are used to produce two phase maps of the test sample that are thereafter compared to assess the surface profile of the sample and, in particular, assess the change in height of element(s) of an SUT; these can be taken as 2 independent measurement scans, one at each state, or they can be interleaved in time, with every other frame representing one state, and the other camera frames measuring the second state.

A person of skill in the art will readily appreciate, upon reading this disclosure, that embodiments are particularly fit for measurements of a structure with spatially-varying reflectivity. Indeed, since all measurement samplings or readings used to measure the surface height or z position at a given SUT location are made at that same location on the SUT, all of them are subject to the same surface reflectivity figure. As a result, the reflectivity value cancels out during the LSPSI calculation and no additional errors are introduced.

It is also appreciated that in a case when the scan axis is not parallel to the x-axis of the imaging camera, the image would drift slightly in the y-direction as consecutive image frames are taken along the x-direction, which can cause image blurring. In practice, substantial parallelism between these two axes should preferably be maintained over the extent corresponding to the FOV of the objective and not necessarily the total extent of the SUT, to achieve the desired results.

It is appreciated that an embodiment of the invention can be operated as a stand-alone tool and/or inspection system or, in the alternative, as part of the inspection sub-system in line with the system configured to fabricate the devices of interest (such as, for example, MEMS-based devices). In one specific case, an embodiment of the invention may be configured as an in-line inspection tool of a lithographic exposure tool or apparatus. To this end, the following provides a general description of an example of such exposure tool.

Exposure Apparatus.

Figure 13:
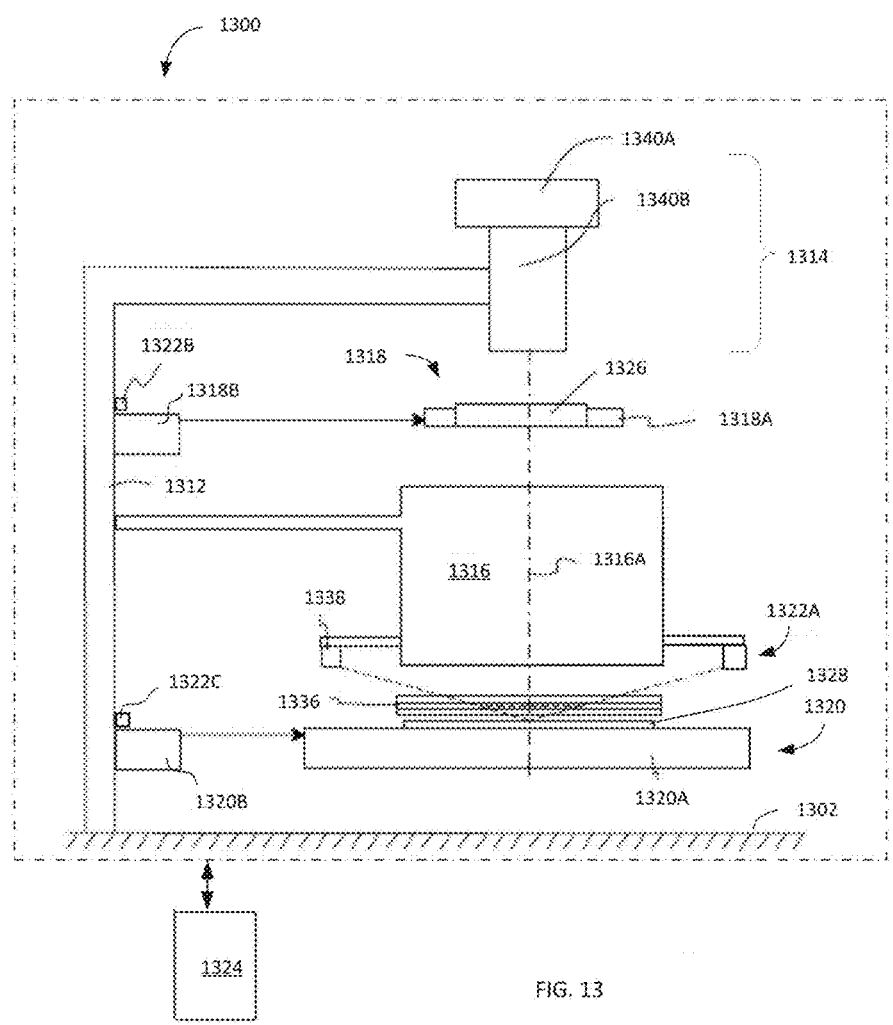
FIG. 13 illustrates an example of a lithographic exposure apparatus in line with which an embodiment of the present invention can be employed.

An example of an exposure apparatus (also interchangeably referred to as a lithographic apparatus), which may employ an autofocus system (AFS) for measurements of wafer displacements is provided, for example, in PCT/US2012/043186, which is incorporated herein by reference. FIG. 13 schematically illustrates, in reference to the provided Cartesian system of coordinates, a schematic illustration of such exposure apparatus.

The exposure apparatus 1300 includes an apparatus frame 1312, an illumination system 1314 (also referred to as irradiation apparatus), an optical assembly 1316, a reticle stage assembly 1318, a wafer stage assembly 1320, a positioning system (shown as a combination of several units including systems 1322A, 1322B, 1322C), and a control system 1324. The design of the components of the exposure apparatus 1300 can be varied to suit specific requirements. The exposure apparatus 1300 may be mounted to/on a mounting base 1302, such as the ground, a base, or floor, or some other supporting structure.

Apparatus Frame. The apparatus frame 1312 is rigid and supports and/or houses at least the reticle stage assembly 1318, the optical assembly 1316, the wafer stage assembly 1320, and the illumination system 1314 above the mounting base 1302.

Illumination System. The illumination system 1314 includes an illumination source 1340A and an illumination optical assembly 1340B. The illumination source 1340A emits radiation to which the wafer/work-piece 1328 is exposed and which is guided by the illumination optics of the assembly 1340B to the optical assembly 1316, along an optical axis 1316A. On its way to the optical assembly 1316, the beam of radiation illuminates a portion of the reticle 1326 to gain spatial pattern of irradiation representing the pattern of the reticle 1326.

The illumination source 1340A can be, for example, any of a g-line source (436 nm), an i-line source (365 nm), a KrF excimer laser (248 nm), an ArF excimer laser (193 nm), a F2 laser (157 nm), or an EUV source (13.5 nm). The wafer-illuminating (exposure) light may be provided at about 193 nm (by an ArF excimer laser system, for example) light (with a wavelength of 193 nm), but it can also include ultraviolet light such as described in, for example, U.S. Pat. No. 7,023,610. The source 1340A of illuminating light may exploit harmonic frequency conversion or utilize an optical-fiber based amplifier, to produce radiation at a predetermined wavelength. Alternatively, the illumination source 140A can generate charged particle beams such as an x-ray or an electron beam. For instance, in the case where an electron beam is used, thermionic emission type lanthanum hexaboride (LaB6) or tantalum (Ta) can be used as a cathode for an electron gun. Furthermore, in the case where an electron beam is used, the structure could be such that either a mask is used or a pattern can be directly formed on a substrate without the use of a mask.

Optical Assembly. The optical assembly 1316 projects and/or focuses the light passing through the reticle 1326 onto the work piece (wafer) 1328. Depending upon the design of the exposure apparatus 1300, the optical assembly 1316 can scale (i.e., to magnify or reduce, with a specific coefficient) dimensions of the pattern of the reticle 1326. In a specific implementation, the optical assembly 1326 may simply relay the pattern of the reticle 1326 onto the wafer (i.e., have a unit magnification).

Reticle Stage Assembly. The reticle stage assembly 1318 holds and positions, (with the use of a reticle stage mover assembly 1318B) the reticle stage 1138A that retains the reticle 1326 relative to the optical assembly 1316 and the wafer 1328. The reticle stage mover assembly 1318B can be designed to move the reticle stage 1318A along any of the x, y, z axes.

Wafer Stage Assembly. The wafer stage assembly 1320 holds and positions (with the use of a wafer stage mover 1320B) the wafer 1328 with respect to the image of the illuminated portion of the reticle 1326 projected onto the wafer. The wafer stage mover 1320B can be designed to move the wafer 1328 along any of the x, y, z axis. In one embodiment, the wafer 128 can be scanned while the wafer stage assembly 1320 moves the wafer 128 along the y-axis.

Positioning System. The positioning system (1322A, 1322B, 1322C) monitors movement of the reticle 1326 and the wafer 1328 relative to the optical assembly 1316 or some other reference. As shown in FIG. 13, the position system 1322 includes (i) an AFS 1322A that maps the topography of the wafer 1328 relative to the optical assembly 1316 along the Z axis (which is collinear with the optical axis 1316A), about the X axis, and about the Y axis prior to exposure of the wafer with improved accuracy; (ii) a reticle measurement system 1322B (only a portion of which is illustrated)

that monitors the position of the reticle stage 1318A and the reticle 1326; and (iii) a wafer measurement system 1322C (only a portion of which is illustrated) that monitors the position of the wafer stage 1320A along the X and Y axes, and about the Z axis. Due to operation of the position system, the wafer stage assembly 1320 can be controlled to position the wafer 1328 with improved accuracy. The positioning system 1322 can utilize laser interferometers, encoders, autofocus systems, and/or other measuring devices.

One known implementation the autofocus system 1322A includes a reference system 1336 providing a reference signal used in conjunction with and related to the measurement of any changing operational parameter of the AFS 1322A but not the position of the wafer 1328 along the optical axis 1316A. The AFS 1322A further includes a measurement system 1338, which provides a measurement signal used in conjunction with and related to the measurement of anything changing in the AFS 1322A including (the change of, if present,) position of the wafer 1328 along the optical axis 1316A. By comparing the reference and measurement signals, the position of the wafer 1328 is measured, which is accompanied with reduction of the stability requirements for many of the components of the AFS 1322A.

A typical measurement system 1338 may include an encoder assembly (not shown) that measures, in operation, the position of a work piece (as shown—the wafer 1328). For example, in some embodiments, the encoder assembly can be designed to monitor and/or measure the position of the work piece along two axes (e.g., along the x- and y-axes). Additionally and/or alternatively, the encoder assembly can be designed to measure and/or monitor the position of the work piece 1328 along all three axes (i.e., to specify the 3D position of the work piece 1328).

The conventional measurement system 1338 may also include a stage grating (not shown) that is secured to a side of the wafer stage 1320A (of the assembly 1320) that retains the work piece 1328, and one or more fixed encoder heads (not shown). The number of encoder heads and their mutual positioning and orientation can be varied according to the design of the exposure apparatus 1300 and/or the measurement system 1338, and the amount of travel of the stage 1320A along x- and y-axes. The use of multiple encoder heads enables the encoder assembly to more accurately measure the position of the stage 1320A, and thus the position of the work piece 1328 that is retained by the stage 1320A. Examples of the structure(s) of the measurement system 1338 and encoder head(s) are discussed in detail in U.S. 2014/0049762, which is incorporated herein by reference, and will not be addressed here additionally.

Control System. The control system 1324 is operably connected to and governs the operation of at least the illumination system 1314, the reticle stage assembly 1318, the wafer stage assembly 1320, and the positioning system 1322. The control system 1324 acquires measurement data, from the positioning system 1322, that represent position and/or orientation and/or movement of the reticle 1326 and/or wafer 1328 with respect to the optical assembly 1316 or another chosen reference. Based on these data, the control system 1324 controls the assemblies 1318, 1320 to precisely position the reticle 1326 and the wafer 1328. The control system 1324 can include one or more processors and electronic circuits, at least one of which may be specifically programmed to perform steps of data acquisition, data processing, and control of operation of the components of the apparatus 1300.

Generally, the exposure apparatus 1300 can be used as a scanning type photolithography system for optical transfer of a spatial pattern from the reticle 1326 onto the wafer 1328, with the reticle 1326 and the wafer 1328 moving synchronously. Alternatively, the exposure apparatus 1320 can be used as a step-and-repeat type photolithography system that exposes the reticle 1326 while the reticle 1326 and the wafer 1328 are stationary. The use of the exposure apparatus 1300, however, is not limited to a photolithography system for semiconductor manufacturing and can include, as a non-limiting example, the use as an LCD photolithography system that projects a liquid crystal display device pattern onto a rectangular glass plate or a photolithography system for manufacturing of a thin film magnetic head.

Fringe-Projection AFS. As is understood by a skilled artisan, the principle of operation of a fringe-projection AFS (FP AFS) used in related art as part of the exposure apparatus is based on projecting (imaging of) a chosen irradiance pattern formed with the use of the diffraction grating onto the target surface under test (for example, a surface of a semiconductor wafer being measured) and the following re-imaging an fringe pattern formed on the surface onto an plane of the optical detector. Such imaging and re-imaging facilitate the determination of both the initial (or nominal) position of the surface and its new position (for example that resulting from the movement of the surface along a line normal to its surface) based on changes of the fringe-pattern formed on the optical detector, which is optically conjugate with the surface of the wafer. For detailed discussion of an example of the AFS the reader is referred to our prior applications, for example to Ser. No. 14/808,197 published as US 2016/0025480, the disclosure of which is incorporated herein by reference. Additional details of embodiments of a typical fringe projection AF system and its operation in the exposure apparatus can be found in, for example, commonly assigned U.S. Patent Application Publications 2011/0071784 and 2012/0008150, as well as the patent application publication WO 2012/177663, the disclosure of each of which is incorporated herein by reference. FIG. 2F provides another schematic illustration of the FP-AFS used in the related art (where the fringe-projection portion is shown to include the diffraction grating of the AFS.)

For the purposes of this disclosure and the appended claims, the use of the terms "substantially". "approximately". "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these term in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

For example, a reference to an identified vector or line or plane being substantially parallel to a referenced line or plane is to be construed as such a vector or line or plane that is the same as or very close to that of the referenced line or plane (with angular deviations from the referenced line or plane that are considered to be practically typical in related art, for example between zero and fifteen degrees, preferably between zero and ten degrees, more preferably between zero and 5 degrees, even more preferably between zero and 2 degrees, and most preferably between zero and 1 degree). For example, a reference to an identified vector or line or plane being substantially perpendicular to a referenced line or plane is to be construed as such a vector or line or plane the normal to the surface of which lies at or very close to the referenced line or plane (with angular deviations from the referenced line or plane that are considered to be practically typical in related art, for example between zero and fifteen degrees, preferably between zero and ten degrees, more preferably between zero and 5 degrees, even more preferably between zero and 2 degrees, and most preferably between zero and 1 degree). For example, a term "substantially-rigid", when used in reference to a housing or structural element providing mechanical support for a contraption in question, generally identifies the structural element that rigidity of which is higher than that of the contraption that such structural element supports. As another example, the use of the term "substantially flat" in reference to the specified surface implies that such surface may possess a degree of non-flatness and/or roughness that is sized and expressed as commonly understood by a skilled artisan in the specific situation at hand. Other specific examples of the meaning of the terms "substantially", "about", and/or "approximately" as applied to different practical situations may have been provided elsewhere in this disclosure.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, it is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

The operation of embodiments of the invention has been described as including a specifically-programmed computer-readable processor controlled by instructions stored in a tangible, non-transitory storage memory. The memory may be random access memory (RAM), read-only memory (ROM), flash memory or any other memory, or combination thereof, suitable for storing control software or other instructions and data. Instruction information may be conveyed to a processor through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

Disclosed aspects, or portions of these aspects, may be combined in ways not listed above. Accordingly, the invention should not be viewed as being limited to the disclosed embodiment(s).

What is claimed is:

1. A method for profiling a surface, the method comprising:
determining a height profile of the surface based on phases of light distribution, formed in reflection of light by the surface with the use of an interferometer and containing interferometric fringes that are angularly tilted with respect to a direction of an in-plane scanning of the surface, while the surface is being scanned in said direction perpendicular to an optical axis of a sample arm of the interferometer in absence of angular inclination between said optical axis and a line that is perpendicular to the surface,
wherein a region-of-interest (ROI) at said surface has an ROI dimension that is at least twice as big as a dimension of a field-of-view (FOV) of an objective of the sample arm of the interferometer as defined on the surface,
wherein said determining is accomplished for all of the ROI in a first time that is smaller than a second time by at least an order of magnitude, and
wherein the second time is a time required to determine said height profile for all of the ROI with a vertical scanning interferometer.

2. A method according to claim 1, further comprising scanning said surface in said direction by incrementally shifting said surface in a plane perpendicular to the optical axis, wherein a shift increment of said scanning is optically conjugate to an integer number of pixels of an optical detector, configured to acquire said light distribution in an optical system containing said interferometer.

3. A method according to claim 1, comprising tilting a reference reflector in a reference arm of the interferometer to form at least 1.5 of said interferometric fringes across a field-of-view (FOV) of an objective in a reference arm of said interferometer.

4. A method according to claim 1, further comprising configuring the interferometer to define an angle of tilt between said interferometric fringes and said direction to be different from zero.

5. A method according to claim 1, further comprising changing a width of an apodization curve, limiting a distribution of intensity of said interferometric fringes and representing a change in contrast of said interferometric fringes, by modifying a cross-sectional profile of said light delivered to the interferometer.

6. A method according to claim 1, wherein said determining includes determining said height profile of the surface that has been patterned in a lithographic exposure tool, wherein said interferometer is in-line with said exposure tool.

7. A method for profiling a surface, the method comprising:
    positioning the surface perpendicularly to an optical axis of an objective in a sample arm of the interferometer;
    configuring a reference arm of the interferometer to form interferometric fringes, at an optical detector of an optical system containing said interferometer, that are tilted with respect to a chosen axis when the surface is illuminated through the sample arm; and
    acquiring optical data from a distribution of light formed at said optical detector and containing said interferometric fringes while the surface is being scanned along the chosen axis in a plane of the surface; and
    determining a height profile of the surface based on phases of said distribution of light, assessed during said acquiring,
    wherein a region-of-interest (ROI) at said surface has an ROI dimension that is at least twice as big as a dimension of a field-of-view (FOV) of the objective of the sample arm of the interferometer as defined on the surface,
    wherein said determining is accomplished for all of the ROI in a first time that is smaller than a second time by at least an order of magnitude, and
    wherein the second time is a time required to determine said height profiled for all of the ROI with a vertical scanning interferometer.

8. A method according to claim 7, further comprising scanning the surface by shifting said surface along the chosen axis in the plane of the surface by an increment a value of which is determined as a distance that is optically conjugate to an extent of an integer number of pixels of said optical detector in said optical system.

9. A method according to claim 7, wherein said configuring includes tilting a reference reflector by a first angle to define a non-zero angle of tilt of said interferometric fringes with respect to the chosen axis.

10. A method according to claim 7, wherein said positioning the surface includes positioning the surface that has been exposed to radiation in a lithographic exposure tool.

* * * * *